United States Patent [19]
Roth

[11] Patent Number: 4,876,728
[45] Date of Patent: Oct. 24, 1989

[54] VISION SYSTEM FOR DISTINGUISHING TOUCHING PARTS

[75] Inventor: Scott D. Roth, Rowland Heights, Calif.

[73] Assignee: Adept Technology, Inc., San Jose, Calif.

[21] Appl. No.: 124,408

[22] Filed: Nov. 20, 1987

Related U.S. Application Data

[63] Continuation of Ser. No. 741,313, Jun. 4, 1985, abandoned.

[51] Int. Cl.$^4$ ............................................. G06K 9/48
[52] U.S. Cl. ........................................ 382/21; 382/8; 382/22; 382/25; 358/101
[58] Field of Search .................. 382/8, 14–16, 382/21, 22, 25, 28, 34, 36; 364/513; 358/101, 106, 107; 901/1, 47

[56] References Cited

U.S. PATENT DOCUMENTS

| | | | |
|---|---|---|---|
| 3,541,511 | 10/1967 | Genchi et al. | 382/25 |
| 3,766,520 | 10/1973 | Patterson | 382/25 |
| 4,292,621 | 9/1981 | Fuller | 382/46 |
| 4,493,105 | 1/1985 | Beall et al. | 382/21 |
| 4,501,016 | 2/1985 | Persoon et al. | 382/22 |
| 4,613,942 | 9/1986 | Chen | 901/47 |
| 4,680,802 | 7/1987 | Nishida et al. | 382/8 |
| 4,682,365 | 7/1987 | Orita et al. | 382/14 |
| 4,707,647 | 11/1987 | Coldren et al. | 364/513 |
| 4,712,248 | 12/1987 | Hongo | 382/22 |

OTHER PUBLICATIONS

Gleason et al., "A Modular Vision System for Sensor-Controlled Manipulation and Inspection", *Proc. 9th Symp. on Ind. Robots*, Mar. 1979, pp. 57–70.

Holland et al., "Consight-1: A Vision-Controlled Robot System for Transferring Parts from Belt Conveyors", *Computer Vision & S B Robots*, 1979, pp. 81–97.

Shinians et al., "A Robot Programming System Incorporating Real-Time and Supervisory Control: VAL-II", *Robots*, VIII Conf. Proc., Jun. 1984.

Shlieu, "Segmentation of Digital Curves Using Linguistic Techniques", Computer Vision, Graphics & Ing. Proc., pp. 227–286 (1983).

Bolles, "Recognizing & Locating Partially Visible Objects: The Local Feature Method", *SRI Project*, pp. 1–58, 3/23/82.

Perkins, "Model-Baned Vision System for Scenes Containing Multiple Parts", *G. M. Research Pub.*, pp. 1–16, 6–77.

Bolles, "Robust Feature Matching Through Maximal Cliques", Proc. of SPIE, Apr. 1979.

*Primary Examiner*—Leo H. Boudreau
*Assistant Examiner*—Jose L. Couso
*Attorney, Agent, or Firm*—Flehr, Hohbach, Test, Albritton & Herbert

[57] ABSTRACT

A practical vision system for controlling the positioning of a robot arm recognizes and locates objects. The vision system processes binary images, but recognizes objects based on boundary features such as lines, arcs, corners and holes instead of "blob features" such as area and best-fit ellipse. Consequently, the vision system can process two common situations not handled by blob analysis: merged blobs due to touching or overlapping parts and incomplete blobs due to low image contrast. The microprocessor-based system is interfaced to the robot system and can recognize up to five parts per second.

20 Claims, 9 Drawing Sheets

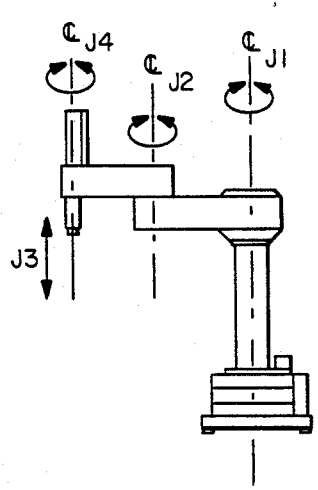
FIG.—1
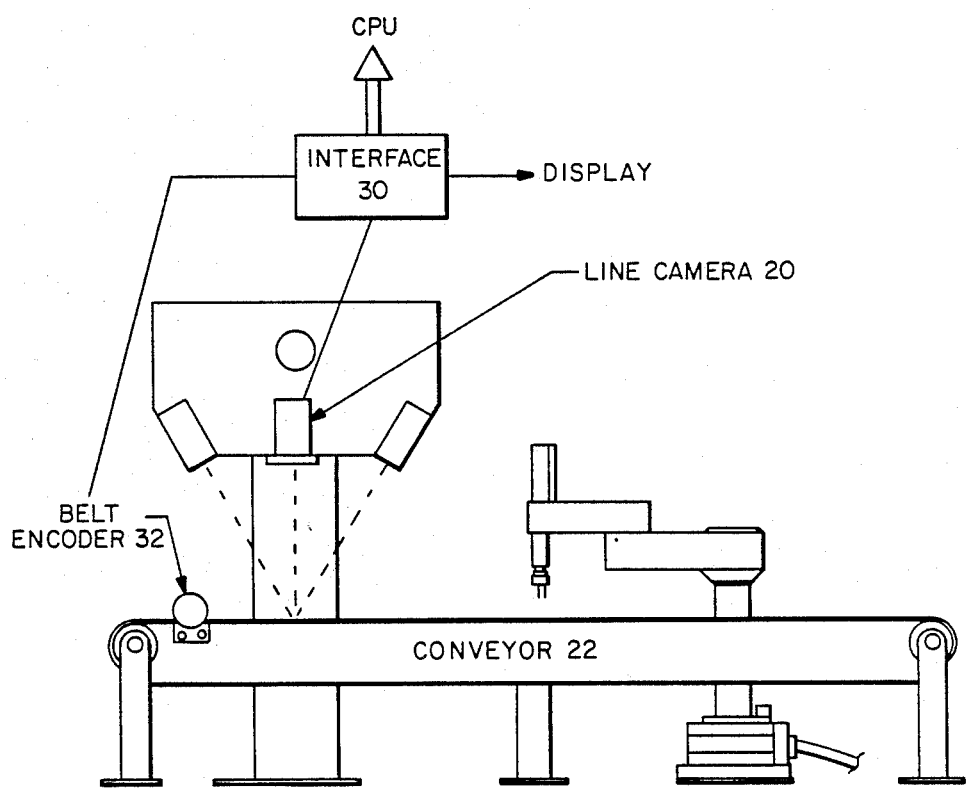
FIG.—2

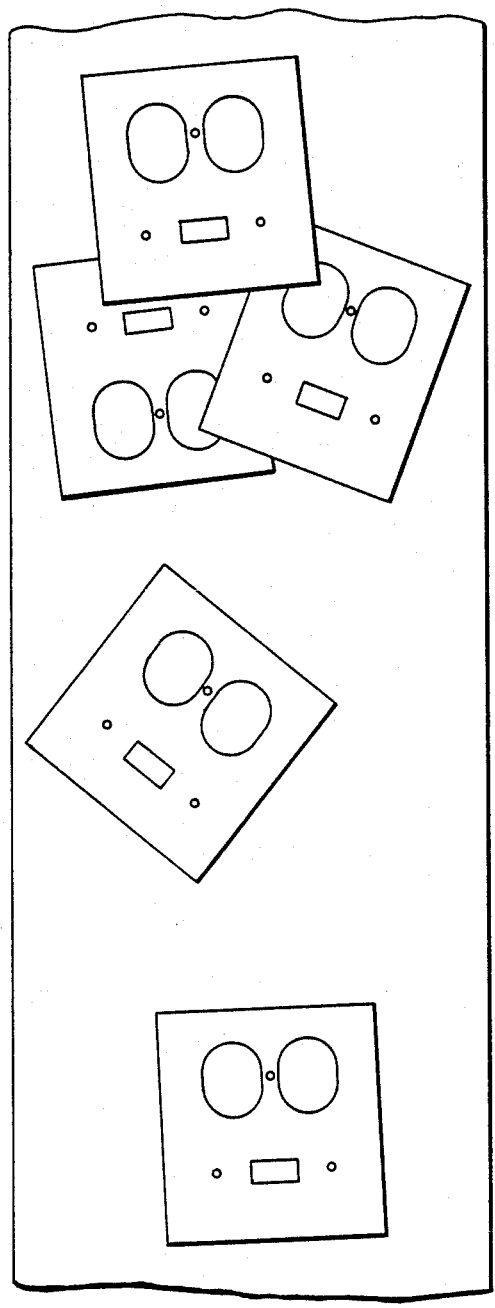
FIG. —5
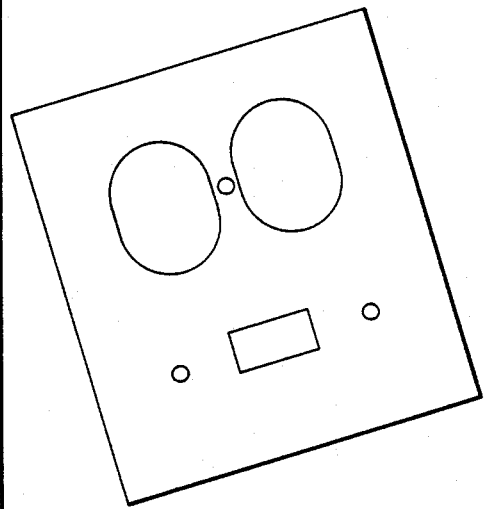
FIG. —6
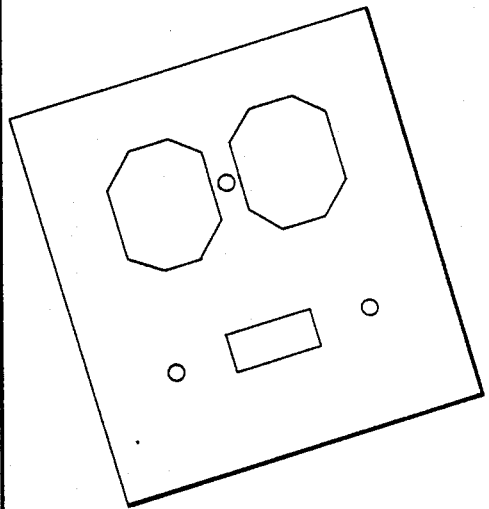
FIG. —7

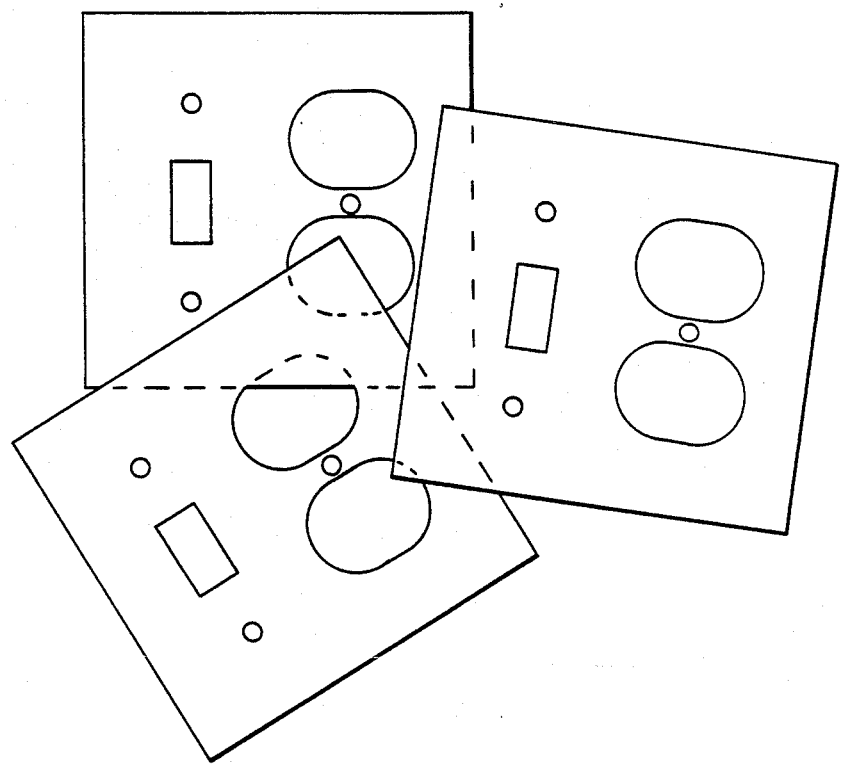
FIG. — 9
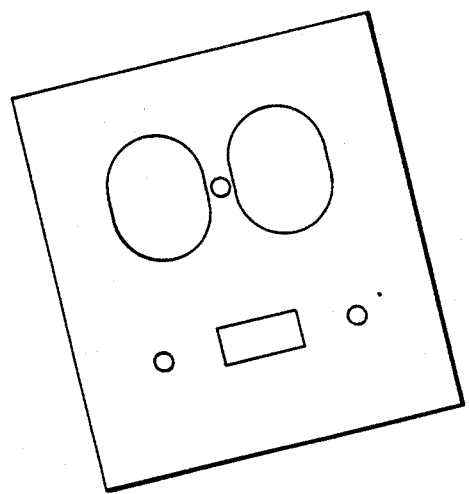
FIG. — 8

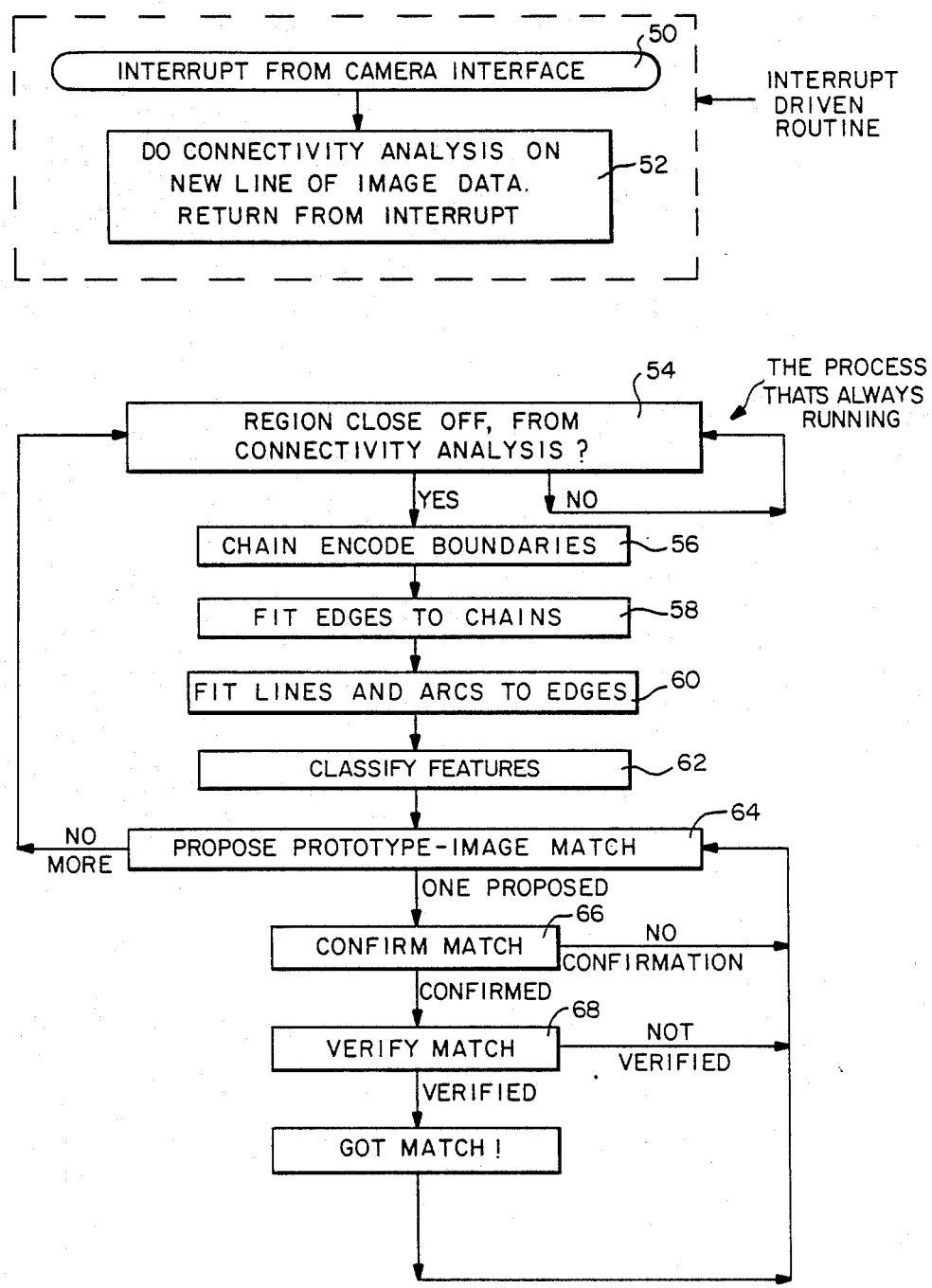
FIG. — 10

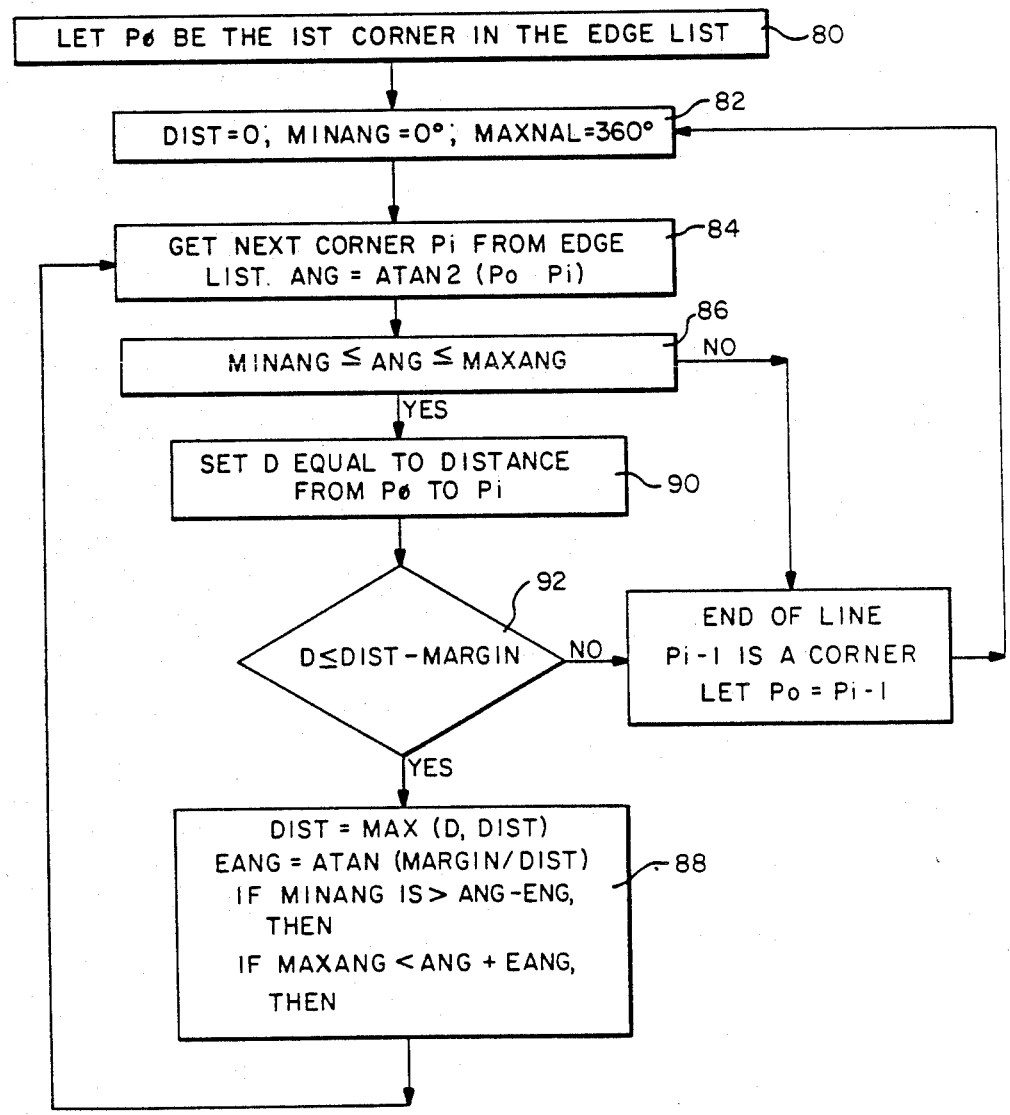
FIG. —11

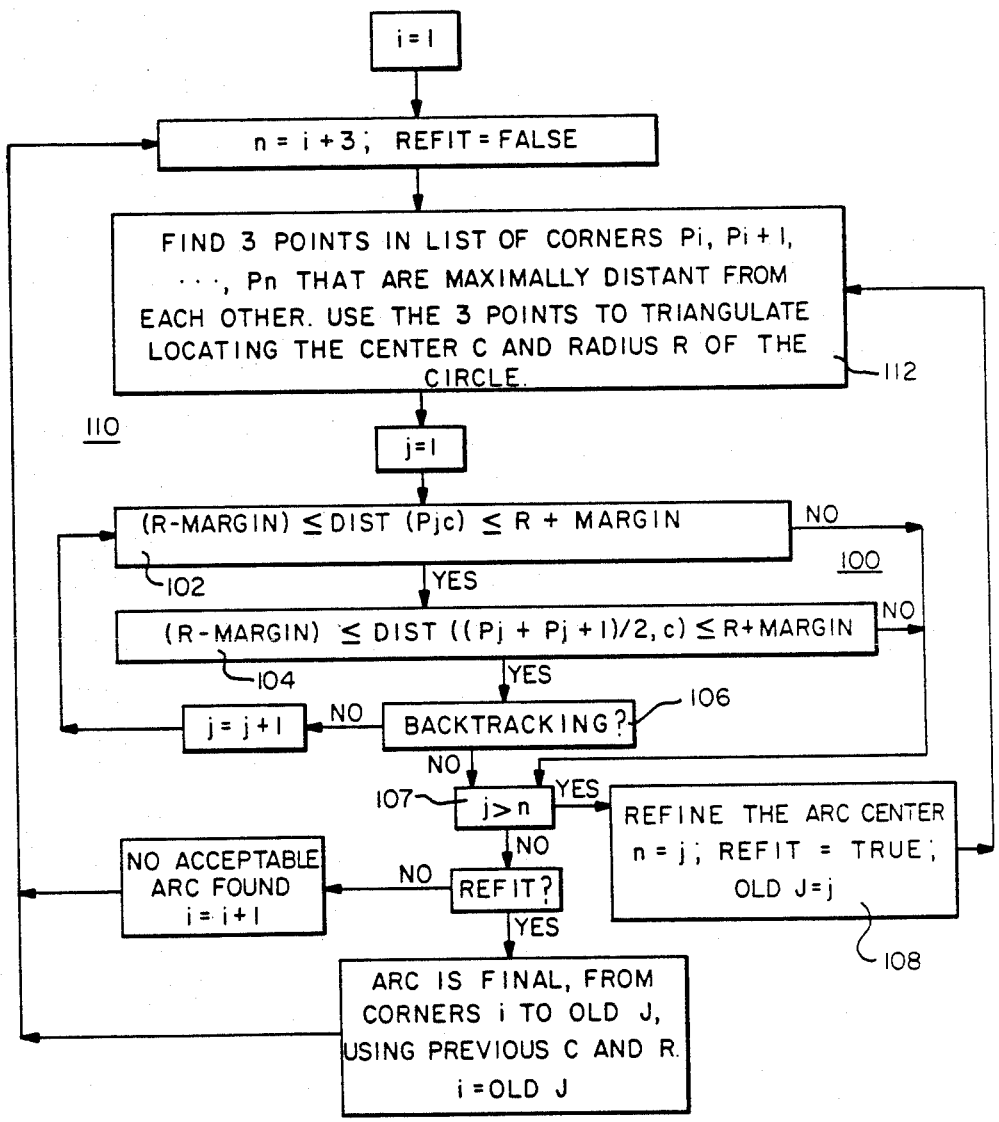
FIG.—12

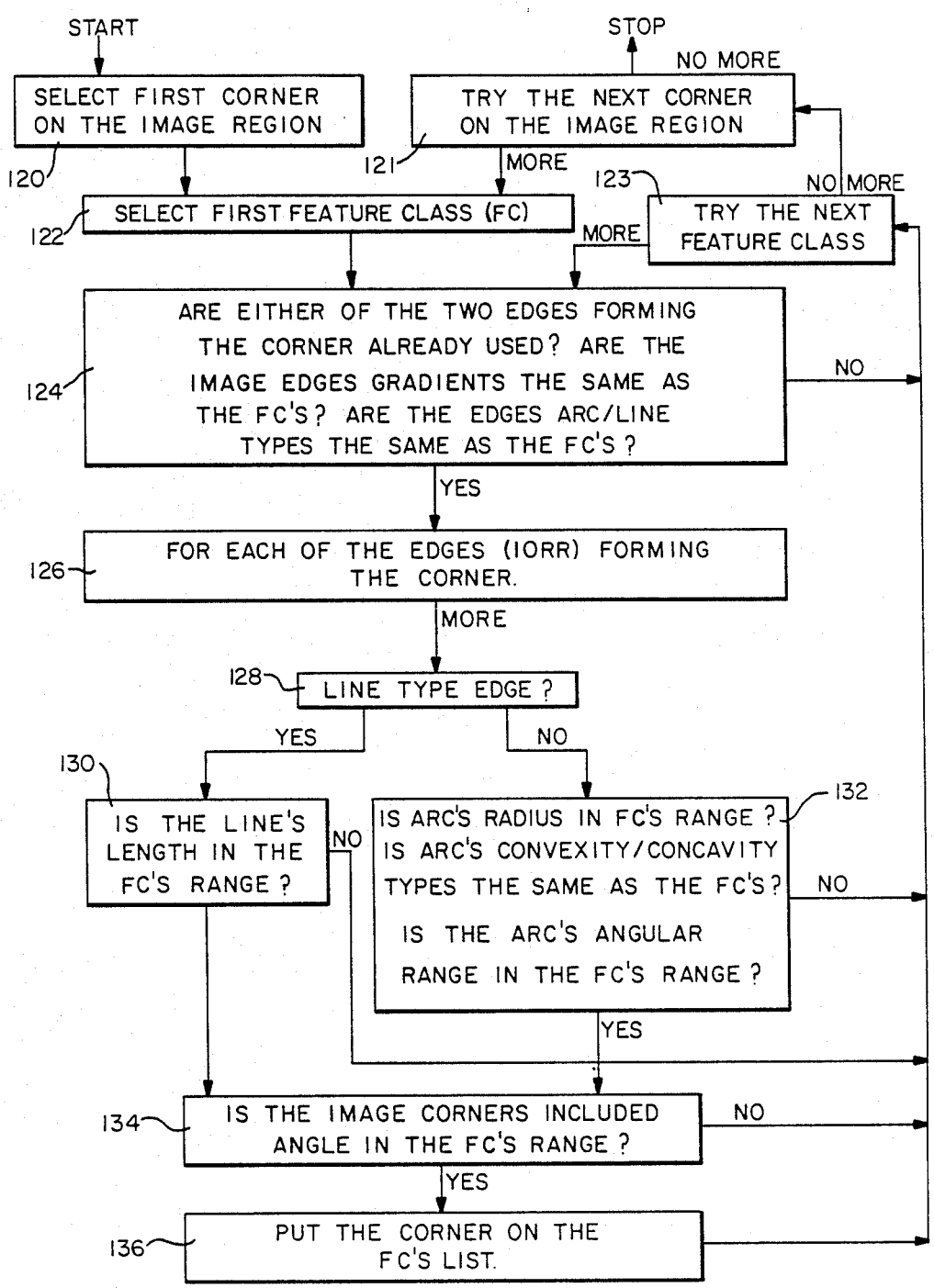
FIG.—13

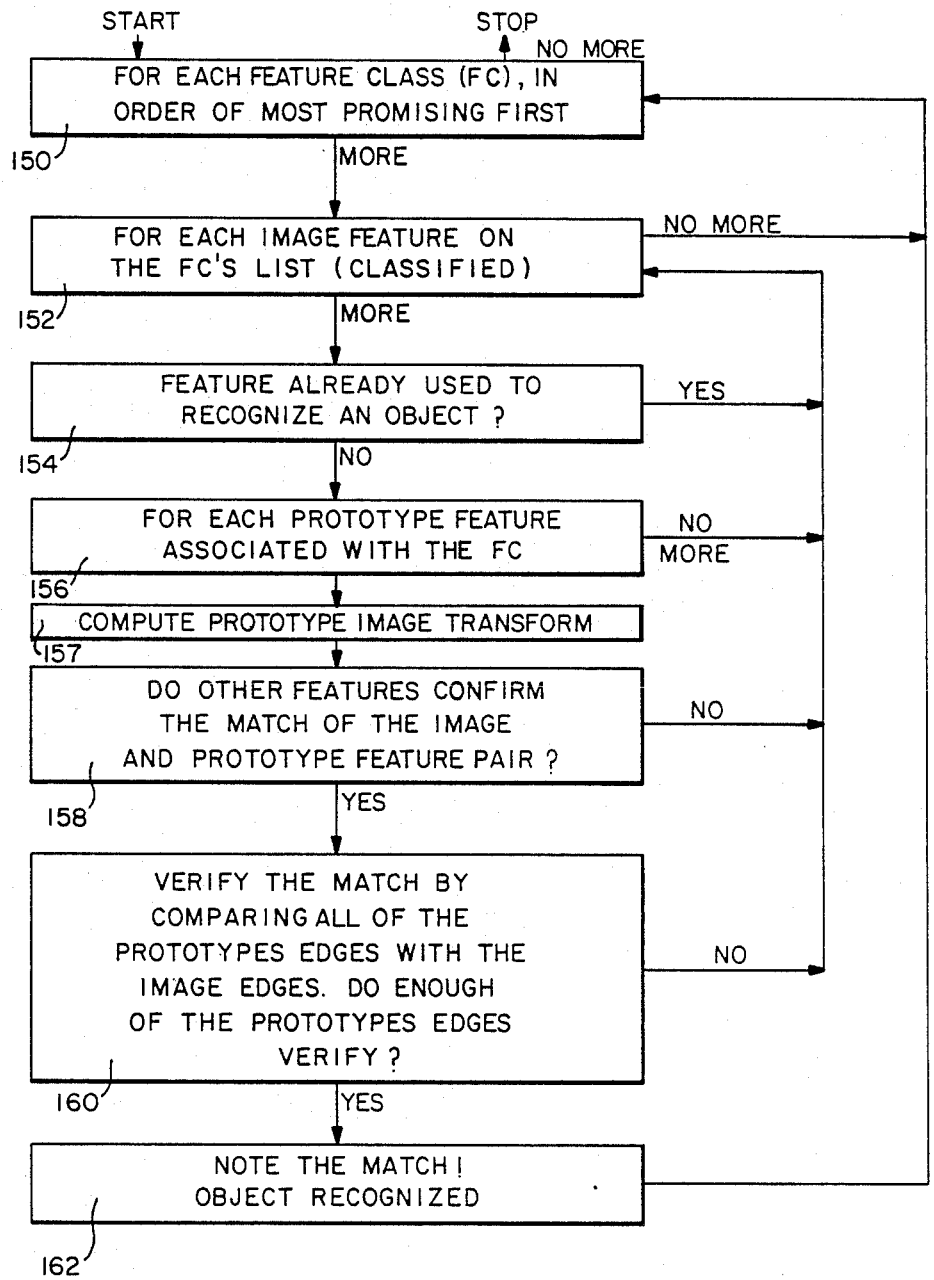
FIG.—14

VISION SYSTEM FOR DISTINGUISHING TOUCHING PARTS

This is a continuation of application Ser. No. 741,313 filed June 4, 1985, now abandoned.

The present invention is directed generally to the field of robot control systems and more particularly to a robot vision system capable of accurately identifying parts moving past the system on a conveyor, even if touching or overlapping.

Almost all commercially available vision systems for robots that locate randomly positioned parts are based on the SRI vision module of Gleason, G., and Agin, G., "A Modular Vision System for Sensor-Controlled Manipulation and Inspection," *Proceedings, 9th International Symposium on Industrial Robots* (Mar. 1979), pp. 57–70. The techniques used are well known. These systems extract "blobs" from binary images via connectivity analysis and then compare the blobs with pre-taught models in order to recognize them. Users train the systems by simply showing them examples of the objects.

Systems like the SRI vision module are efficient, but have a limited application scope. There are two major technical limitations: (1) objects must be in high contrast with the background, and (2) objects must be spatially separated, lest their images become merged into a single blob. For many applications, the high contrast requirement can be satisfied using structured light. An excellent example of the structured light technique is the Consight system which is used in conjunction with a conveyor belt described by Holland, S., Rossol, L., and Ward, M., "CONSIGHT-1: A Vision-Controlled Robot System for Transferring Parts from Belt Conveyors," *Computer Vision and Sensor-Based Robots*, edited by G. Dodd and L. Rossol, 1979, Plenum Press, N.Y., pp. 81–97, incorporated herein by reference. The second limitation, however, is not so easily overcome. The SRI method uses a combination of area, best fit ellipse, perimeter, and second moments of inertia to represent shape in order to recognize objects and determine their orientation. These object descriptors fail when objects are so close together that their images merge into a single blob.

It is an objective of the present invention to provide a robot vision system that significantly relaxes the limitations of high contrast and non-touching parts.

It is a further objective to provide a new and non-obvious system for recognizing parts presented to a robot arm.

Another objective is to provide a vision system which can be "trained" to recognize whatever part or sets of parts will be presented.

Another objective is to provide a vision system which will recognize parts without regard to orientation, or even where parts are overlapping.

Generally speaking, this system uses a new approach to part recognition where objects are characterized by their distinctive corners and edges (local features) instead of gross area characteristics.

The design is based on the following assumptions, although the system is not limited to recognizing parts that satisfy all of these assumptions:

A large majority of parts are composed of rotational and prismatic shapes only. Such parts have image silhouettes consisting of lines and ellipses (usually circles, ignoring the slight distortion due to perspective).

Nearly all parts are rigid or, at worst, are a little flexible. Wires are probably the most common exception. When present, wires are an extra complication. Often, they are partially invisible at standard camera resolution.

Most parts have holes and almost one half have holes completely through them. The holes are usually orthogonal, so they are visible given backlighting.

Most parts have a silhouette that uniquely determines their orientation in their resting plane. Many parts have upside-down ambiguity given a silhouette only. However, part presentation is usually not completely random and not all parts are stable upside down.

The depth of parts (height above the resting surface) is dependent on the mode of manufacturing. Cast, molded, and turned parts typically have more height than sheet metal parts. Most of the parts surveyed that would likely be handled by a robot had significant depth.

Uniform reflectivity and high contrast with the background are unusual. Sheet metal parts and machined parts, probably the majority, reflect specularly. The positions of such reflections depend on the position and orientation of both the part surface and the light source.

The transport mechanism is also an important factor in determining the desired capability of the vision system. In order of occurrence, parts are transported in bins, pallets, conveyors, and miscellaneous means (e.g., by hand). Current and near term robot applications, however, involve conveyors and pallets.

The present invention utilizes a "feature-based" recognition method. This approach uses spatially interrelated boundary features such as lines, arcs, corners, and holes to visually model objects. By comparing features in the image with features in pre-taught models (prototypes), objects in the image are recognized. Since recognition is based on boundary segments and not on "boundary totals," objects may be recognized even when their boundaries appear incomplete due to low contrast or overlap.

Prior research into feature-based methods has been performed by Bob Bolles of SRI International Bolles, R., "Recognizing and Locating Partially Visible Objects: the Local-Feature-Focus Method," Technical Note 262, Artificial Intelligence Center, SRI Int., Mar. 1982; Bolles, R., "Robust Feature Matching Through Maximal Cliques," SPIE Technical Symposium on Imaging Applications for Automated Industrial Inspection and Assembly, Washington, D.C., Apr. 1979, and Walt Perkins of General Motors Research Labs, Perkins, W., "A Model-Based Vision System for Industrial Parts," *IEEE Transactions on Computers*, Vol C-27, No. 2 (Feb. 1978,) pp. 126–143, Perkins, W., "Simplified Model-Based Part Locator," Report GMR-3303, June 1980, G. M. Research Laboratories, Warren, Mich. They did not produce complete, practical vision systems.

In Bolles' system, the features were only corners and circular holes. In the present system, the features are lines, arcs, holes and corners. Bolles' system matched features through "maximal cliques" and this does not. Also, Bolles' system executed very slowly (10× or more). Finally, the way Bolles verifies matches is completely different (he searched the frame grab memory for image edges whereas the claimed system compares the line and arc boundary representations of the image regions with those of the prototype regions). In conclusion, there are more differences than similarities.

When the vision system of the present invention is in its normal execution mode, the operations on the image data are performed in sequence. As the camera provides sensory data on a line by line basis, connectivity analysis is performed and the scrolling display image is updated. When a region closes off (the trailing edge of the object passes under the camera), the vision system processes the region's boundary. This processing involves multiple steps, producing multiple boundary representations, the last of which is a connected sequence of lines and arcs. Finally, recognition is performed by comparing boundary features with the features of the prototype models.

More specifically, there are seven steps to the image processing:
1. Connectivity analysis
2. Chain encode perimeters
3. Fit primitive edges to chains
4. Fit lines and arcs to edges
5. Classify line and arc features
6. Propose prototype-image matches
7. Verify match An object is located and properly identified when all seven steps are successfully completed. At that time, the object's identification, position, 2-D orientation, and "goodness-of-appearance" measure are available to a robot. The invention will be explained in full with reference to the following figures:

FIG. 1 shows a robot or manipulator with which the present invention is especially useful including definitions of all significant joints;

FIGS. 2 and 3 illustrate the two potential types of vision illumination and view systems;

FIG. 5 represent the scrolling display and illustrates the objects being identified and located by the present invention as they appear on a conveyor;

FIG. 6 illustrates a plot of a chain encoded boundary of a region;

FIG. 7 illustrates the step of fitting primitive edges to the chain encoding. FIG. 8 illustrates the step of fitting straight lines and circular arcs to the edges produced in step 3;

FIG. 9 illustrates the step of verifying matches of prototypes to images.

FIG. 10 is a flow chart of the run-time system;

FIG. 11 is a flow chart of the step of fitting lines to the image produced;

FIG. 12 is a flow chart of the step of fitting arcs to the image produced; and

FIG. 13 is a flow chart of the step of classifying features on the objects to the identified;

Figure 3:
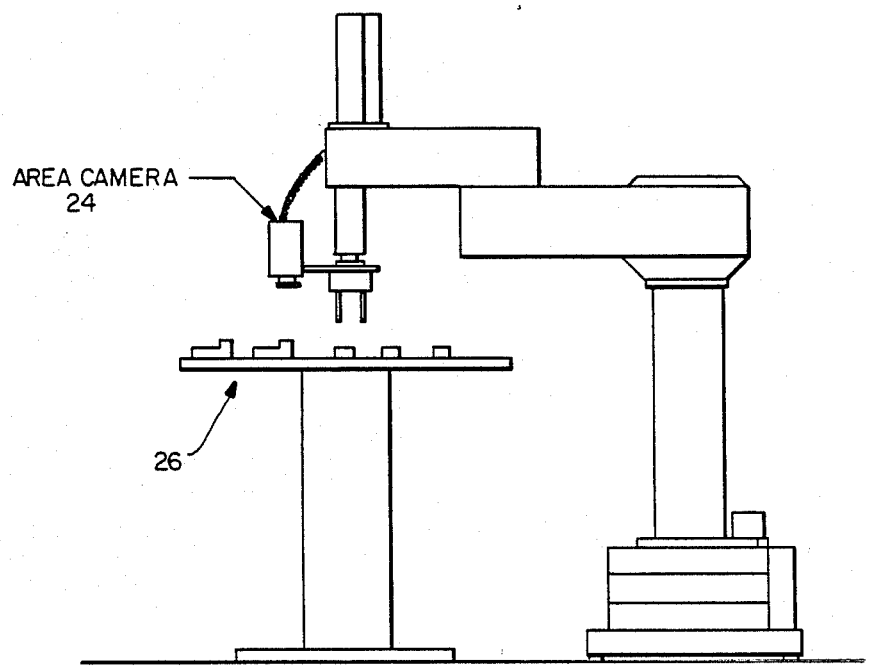

FIG. 14 is a flow chart of the steps of match proposal and verification. The manipulator system with which the present invention is especially useful is described in the application entitled Direct Drive Robot System, Serial No. 694,585, filed Jan. 24, 1985, assigned to the assignee of this invention and incorporated herein by reference. It describes a four-axis robotic system designed primarily for production applications in light material handling, parts kitting, assembly, and packaging. The basic system consists of a controller and a robot. The robot is also called an arm or a manipulator. FIG. 1 shows the controller and the robot. In addition, the basic system can be expanded by the addition of a vision system. There are two kinds of vision systems: a conveyor-based system and an area system. FIGS. 2 and 3 show the vision systems; they will be described in greater detail below.

The manipulator has a cast aluminum structure with electric motors to control the various joints (or axes). In some cases, an axis is referred to as a degree of freedom. The basic manipulator has four degrees of freedom, as shown in FIG. 1.

Joint 1 is a rotation about the vertical column. Joint 2 is a rotation in the middle of the arm. Together, joints 1 and 2 provide for the horizontal positioning of the manipulator.

Joint 3 is a linear joint which extends and retracts vertically at the end of the arm. In typical operations, joint 3 is the axis which lifts objects and places them back down.

Joint 4 is a rotation at the hand (or end effector) mounting flange. It is the axis used to radially orient parts during an operation (such as lining up a square block to fit in a square hole).

At the end of the arm is an end effector flange which is used to mount various hands or tools onto the arm. In addition to mounting tools semi-permanently on the arm, a quick-change mechanism can be provided. With this device, the manipulator can be programmed to automatically change from one hand or tool to another by program command. This is quite useful when performing applications involving two or more operations such as drilling and countersinking.

Several characteristics of the manipulator can be controlled in addition to its position and its tool. The most commonly controlled characteristics are the manipulator speed, its path profile (for moving between positions) and the accuracy to which it reaches taught positions.

Figure 4:
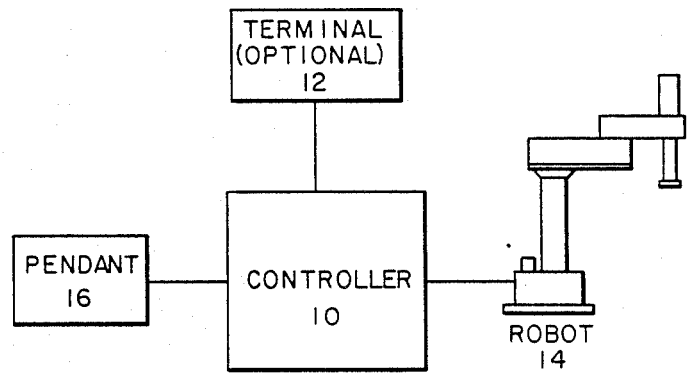
FIG. 4 is a block diagram of the basic robot system.

FIG. 4 is a block diagram of the basic manipulator system. The controller chassis 10 houses the power supply, programming language, manipulator servo electronics and control electronics. The computer terminal 12 is used to program and control the manipulator system 14. The terminal 12 may be removed from the system after the manipulator has been programmed or if pre-written application programs are being used. The manual control pendant 16 is another means of controlling the manipulator 14. When manual (rather than computer programmed) control is desired, the manual control pendant 16 is used. Also, all application programs are designed to use the manual control pendant 16. Such pendants are well known in robot technology, and this pendant is therefore not described further. When the computer terminal 12 is removed from the system, the operator uses the manual control pendant 16 to control the manipulator. The manipulator is connected to the controller via the control cables.

The new vision system described herein uses a feature-based object recognition algorithm. It is microprocessor-based and operates quite fast, recognizing multiple objects per second. It is now integrated in Adept Technology's robots with the VAL-II robot control system described by Shimano, B., Geschke, C., Spalding, C., and Smith, P., "A Robot Programming System Incorporating Real-time and Supervisory Control: VAL-II," *Robots VIII Conference Proceedings,* June 1984, incorporated herein by reference.

The system processes binary images provided by a solid state camera. Although the input image is only binary, the system does edge-type processing to extract object boundary features: lines, arcs, corners and holes. The characteristics of these features and their relative spatial relationships provide an effective visual representation of the image.

The vision system compares boundary fragments (the features which are grouped in feature classes (FC)) in the image with the features of known prototypes. The prototypes are generated during a training session, during which the system is shown sample parts. When the comparison of one or more features is positive, a match is proposed that places the prototype in a particular position and orientation in the image. The prototype-to-image match is then verified by traversing the entire boundary of the prototype, looking for further evidence of its presence in the image. A threshold parameter, pre-specified by the user, determines how much of the boundary must be visible for match acceptance. The vision system operates with either a linear array camera 20 over a conveyor belt 22 (FIG. 2) or with an area array camera 24 over a pallet 26 or similar working surface (FIG. 3). The conveyor application is more complicated than the area for various reasons: the conveyor image data arrives only a line at a time at a variable rate, the image is "infinitely" long, and image coordinates along the conveyor must be kept in synchronization with the manipulator's tracking coordinates.

Since the linear array camera interface encompasses the problems of an area array interface, only the conveyor application will be discussed below.

The vision system is part of an integrated robot controller wherein various hardware and software resources are shared. The heart of the vision system is a Motorola 68000 10 MHz processor. It shares a backplane with other processors, one of which executes the VAL-II robot control system referenced above. VAL-II is the master process through which all user input and output to the vision system passes.

In addition to the processor and memory, the vision system consists of a solid state, linear array camera 20 (256×1 elements), a high resolution monochrome display, a graphics display interface board, and a camera interface board 30. The robot's conveyor tracking hardware is used to synchronize camera data acquisition with the conveyor movement. The camera is strobed whenever the conveyor moves a fixed unit of distance as indicated by the belt encoder 32, so the conveyor may move at a variable speed and even stop for an indefinite time without loss of image data or synchronization.

As the belt moves, the camera continuously sends line images to the vision processor. So, as the belt moves, the vision processor is able to form an area image of the conveyor belt. This image processing is continuous, not stopping until a "picture off" command or instruction is issued. With the line vision system, Consight lighting, described in the above reference, is recommended. This structured lighting technique is a very effective, eliminating the need for any object/background contrast. In some applications, however, conventional overhead lighting may be best.

It should be noted that the camera integration time must be controlled. For example, if the integration time is set to be 4 ms., the camera will process up to 1000/4.6 or 222 lines of image data per second. Other integration times may be selected. The shorter the time, the faster the belt may travel, but less light will be sensed by the camera.

When positioning the line camera, the camera line of sight is "exactly" perpendicular to the travel of the belt. The reason for this restraint is that prototype scaling is assumed to be constant. That is, the same object should always appear to be the same size, regardless of where in the scene it is. Consequently, the camera's direction of sight should be perpendicular to the surface upon which the objects lie. Otherwise, the objects will look bigger on the side of the surface closer to the camera than on the other side. Some scaling variance due to parallax will be impossible to avoid. In general, the further camera is from the working surface and the shorter the objects to be recognized, the less geometric distortion will occur due to parallax.

Calibration of the system is necessary for two reasons. The vision system needs to know the ratio of pixel length to pixel width. Knowing this ratio, the vision system subsequently scales the width of pixels to make them square. This way, circles will look circular and not elliptical.

The other reason for calibrating is defined the vision-to-robot relationship. The relationship is basically a transformation that will transform vision locations from image space to arm space. Image space is 2-D with pixels as the distance unit. Robot space is 3-D with millimeters as the distance unit. The transformation usually involves translation, rotation, and scaling.

The camera is mounted over a conveyor belt, normally looking straight down at the belt. The camera interface board thresholds the image data as it arrives and presents the data to the vision processor as run-lengths (the column numbers where black-to-white or white-to-black transitions occur). The implied object boundaries are simultaneously displayed on the video monitor and the monitor image is scrolled to reflect the conveyor movement. All subsequent processing of the image data is via software.

The robot vision system recognizes and locates randomly positioned objects in the scene so that the robot may pick them up. The objects may be on a conveyor belt, pallet, or similar working surface. With vision, parts do not have to be precisely fed to the robot by a special mechanism. The resulting work cell is more flexible and more easily set up. In addition, robot vision systems may be used to visually inspect parts or to simply confirm their expected presence in the work cell.

The present system is a feature-based robot vision system, where the features are pieces of image boundaries. Specifically, the system thresholds camera images into black and white regions. Then, it characterizes the boundaries of the regions as connected sequences of straight lines and circular arcs. Lines, arcs, corners and holes are the features upon which recognition is based.

More specifically, there are seven steps to the image processing:
1. Connectivity analysis
2. Chain encode perimeters
3. Fit primitive edges to chains
4. Fit lines/arcs to edges
5. Classify line and arc features
6. Propose prototype-image matches
7. Verify match The basic flow chart of the vision recognition system appears in FIG. 10. Interrupts occur from the camera interface 30 dependent on and synchronized with the movement of the belt. Typically, if the belt is of width x, then an interrupt occurs every x/256 minute. This transfers a line of data to the processor. Following the interrupt 50, a connectivity analysis step 52 is done on the new line of data.

This analysis is essentially a blob analysis of a type done in the prior art which segments the image into black and white regions. This connectivity analysis step 54 comprises the first of the seven steps of the basic analysis process which is used to identify the objects passing by on the conveyor.

1. Connectivity Analysis (Step 54). This is the common SRI technique for separating closed regions from the background. The processing is performed in a single pass across the binary image—appropriate for "infinitely long" conveyor belt images. Input to the connectivity analysis is the output of the camera interface hardware: run-length encodings on a line-by-line basis. This compact image representation is simply a list of the column numbers where there are "color" transitions of black-to-white or white-to-black. Whereas the camera interface hardware groups contiguous horizontal pixels of the same color into run-lengths, connectivity analysis groups continuous vertical run-lengths of the same color, thereby completely segmenting the image into black and white regions. While processing the run-length encodings, the algorithm also computes the area and perimeter of each region. Finally, as regions close off, they are interrelated via parent, child, and sibling relations. A hole in a region is a child of the outer region and the outer region is a parent of the inner region. Two holes in a region are mutual siblings. A published Pascal program that does connectivity analysis based on run-length endodings is found in the following references, incorporated herein by reference. Gleason, G., and Agin, G., "A Modular Vision System for Sensor-Controlled Manipulation and Inspection," PROCEEDINGS, 9TH INTERNATIONAL SYMPOSIUM ON INDUSTRIAL ROBOTS (Mar. 1979), pp. 57–70, Cunningham, R., "Segmenting Binary Images," ROBOTICS AGE, July/Aug. 1981, pp. 4–19.

Connectivity analysis is performed in response to interrupts from the camera interface board, on a line-by-line basis. All subsequent processing, steps 2–7, is performed in the background (i.e., not interrupt driven), on a complete region basis. An illustration of the result of this step appears in FIG. 5.

2. Chain Encode Perimeters (Step 56). Processing proceeds with this step after the outermost region, the region whose parent is the background, closes off. This step produces a chain encoding representation of the region's perimeter. Using the stored run-length encodings with their region associations provided by connectivity analysis in step 1, a string of right, up, left, and down moves are produced that will traverse the region's perimeter (as illustrated in FIG. 6). The basics of chain encoding are explained by Freeman: Freeman, H., "Boundary Encoding and Processing," Picture Processing and Psychopictorics, edited by B. Lipkin and A. Rosenfeld, 1970, Academic Press, N.Y., pp. 241–266, incorporated herein by reference.

3. Fit Primitive Edges to Chains (Step 58). This step fits straight line segments to the chain encodings in order to produce a more succinct representation of the region's perimeter. The algorithm used is efficient and the edges produced are an accurate approximation to the chain encoding. A benefit of the algorithm is that the jagged (quantized) edges represented by the chain encoding are smoothed. After this step, the chain encoding data is discarded. FIG. 7 illustrates the edges fit to the chain encoding in FIG. 6. Corners are drawn as knots on the edges. The fundamentals of encoding are explained in Shlien, Seymore, "Segmentation of Digital Curves Using Linguistic Techniques," COMPUTER VISION, GRAPHICS, AND IMAGE PROCESSING 22, 277–286 (1983), incorporated herein by reference.

4. Fit Lines and Arcs to Edges (Step 60). This processing step fits straight lines and circular arc segments to the edges produced in step 3. This step is relatively expensive in processor time, but the expense is well justified. First of all, lines and arcs are fit to within a user specified tolerance, so image smoothing is controlled. Secondly, the result is a further data reduction, especially when the parts are circular or have circular holes. Industrial parts studies have shown that the majority of parts are prismatic and rotational in shape, so their 2-D images are naturally represented by lines and arcs. The final justification for fitting lines and arcs, as opposed to fitting lines only, is that they provide a greater variety of edge and corner types, making recognition easier. FIG. 8 illustrates the lines and arcs fit to the edges in FIG. 7. (Note: the lines and arcs fit are not always this clean.) A more detailed flow chart of these two steps appears in FIGS. 11 and 12, explained below.

It is important to note that input to lines fitting is the list of corners produced by edge fitting. Each corner Pi is 2D coordinate (Xi, Yi). "Margin", as it appears in the flow chart of FIG. 11, is the user specified, maximum pixel variance allowed (for smoothing).

The input to arc fitting (FIG. 12) is the list of corners produced by edge fitting. Each corner Pi is a 2D coordinate (X, Y) "Margin" as it appears above. The maximum pixel variance allowed (specified by the user). "DIST(,)" is a distance function that computes the distance between the Z given points.

5. Classify Features (Step 62). This step classifies all connected edges and corners, where the edges are the lines and arcs from step 4, and associates them with the feature classes of the known prototypes. The feature classes are chosen during training, based on the objects the user wants the vision system to recognize. Generically, there are only a few types of corner classes: line-line, line-arc, arc-line, arc-arc, and circle. In addition, there are the wild card variations (or edge classes): line-any, any-line, arc-any, and any-arc. The "any" refers to an edge that may belong to a different object because two parts touch or overlap.

Although there are only a few generic types of features, each of the prototype's feature classes have specific parameterized definitions. Associated with each corner class is an acceptable minimum and maximum included angle (angle formed by the two edges). For an edge class, the angle is 0°–360°. Also, associated with each line edge of a feature class are acceptable minimum/maximum lengths. For arcs there are acceptable minimum/maximum angular ranges, minimum/maximum radii, and a convex/concave indication.

Each edge in the image is compared with all feature classes. When the types correspond and the measures of the edge fall within the acceptable ranges of the class, the edge is placed on the feature class' association list. Some edges in the image may not be associated with any classes whereas others may be associated with multiple ones.

A more detailed flow chart of this step appears in FIG. 13.

6. Propose Prototype-Image Matches (Step 64). This step proposes that prototypes are present in the image at specific positions and orientations. These prototype-to-image match proposals are based on the feature classifications made in the previous step. During training, the feature classes are ordered according to uniqueness and "clarity." A run-time, in this order, each class is considered until all image edges have been accounted for or until all possible matches have been proposed. Each image edge and prototype edge associated with a class are a possible match. However, such matches must be confirmed before an official proposal can be made and step 7 begins.

Confirmation (Step 66) is a partial verification (see step 7 below) that is required when more than one prototype corner is associated with a feature class. Even if there is only one corner associated with a class, confirmation will be used if the prototype is complex, having many edges, so that mismatches will be detected before the expensive verification step. The need for confirmation is determined during training when feature classes are chosen. Associated with each prototype corner is a list of the confirming corners which, if present in the image at the same relative position, would distinguish it from others. Nearby corners are chosen as confirming corners when appropriate because they are more likely to be visible (not occluded) along with the corner to be confirmed.

7. Verify Match (Step 68). Given a single prototype-to-image match proposal, this step verifies the prototype's presence in the image. The prototype's boundary representation is transformed to the image via the 2-D translation and rotation proposed in step 6, and a search is made for image edges that align with the prototype edges. The close-enough test is to within a user specified tolerance. Although the signs of the edges (black-to-white versus white-to-black) must correspond, the edge types do not. So lines verify arcs and vice versa. If enough of the prototype's boundary is present in the image, the match is accepted. "Enough" is a weighted threshold, specified by the user during training.

FIG. 9 shows the result of three match verifications. For each proposed match, the prototype was drawn overlaying the image. Edges that were verified are shown with solid lines. Edges not verified are shown with dotted lines. This figure, as well as FIGS. 5 through 8, are display options in the vision system.

A flow chart of this step appears in FIG. 14, explained below.

The operator teaches the vision system to recognize objects by showing the system examples of them. This process is called recognition training and the objects taught are called prototypes. The prototype models are stored in computer memory for use during the recognition process. However, the prototypes may be stored on disk for retrieval at another time.

Training the vision system to recognize specific parts is necessary because the system is based on breaking down the edges (external and internal) into lines and arcs. However, there are some important training guidelines and recognition parameters that may be critical for some applications.

Vis training, the system collects mean and standard deviation statistics on the dimensions of the parts. The more examples of the part given, the better. As a general rule, the operator should train the system on a dozen examples. With a little experience, training the system on a dozen examples is easy.

The system may be trained to recognize multiple objects at a time. There is no fixed maximum number of prototypes, but memory is limited and the more prototypes the system knows about, the more time it takes to distinguish between them. So there is a practical limit. As a guideline, the system may be taught ten very simple objects or one very complicated object. An unlimited number of prototypes may be stored on disk, however.

The system processes the image of the prototype through boundary analysis described previously. The result of the line and arc fitting is displayed on the vision monitor so that the operator can edit it. From this point on, all training is performed using the robot manual control pendant.

The boundary representation of the prototype must be edited to clean up the system model of the part's "topology." Here, topology refers to the individual edge types, either lines or arcs, and the number of corners. Each trained instance of the part must have the same topology.

The operator edits the model by moving a cursor around the screen and pushing edit keys on the manual control pendant. The effect of an edit command is instantly displayed. There are five edit functions, controlled by the five "soft keys" at the top of the manual control pendant. A two-line display on the pendant labels the keys as follows:

| Delete corner | Restore corner | Arc/ line | Delete hole | Show features |
| --- | --- | --- | --- | --- |

Briefly, the keys have the following effects. The "Delete corner" key deletes the corner that is nearest the cursor position. Conversely, the "Restore corner" key creates a new corner. The "Arc/line" key toggles the type of the edge nearest the cursor. A line becomes an arc or vice versa. The "Delete hole" key deletes the region containing the cursor. This key is for deleting undesirable holes in the image. Since the effect of this key cannot be undone, the manual control pendant prompts for confirmation. In response, the YES or NO key must be pushed. Finally, the "Show features" key makes the system blink the corners and separately show the lines and arcs in the boundary model. To terminate this special display mode and resume editing, the "Show features" or REC/DONE key must be presses.

The cursor is moved about the screen via the keys and the number key pad. The speed slide on the manual control pendant may be used to control the speed of cursor movement.

The REC/DONE key terminates editing. When pushed, the operator is presented with the following choices on the pendant two-line display:

| Resume editing | Discard example | Pick ref. edge |
| --- | --- | --- |

The "Resume editing" soft key will return the user to the editing mode described above. The "Discard example" key will abort the edit of the prototype instance. The "Pick ref. edge" key is the normal exit key. Before pushing this last key, the operator must position the cursor on an edge of the prototype. The edge chosen will be the reference edge for future examples of the part. The same reference edge must be chosen with each new instance of the part so that the system knows how to correlate the example with the old.

When the operator is finished editing an example and the example is not the first instance of the prototype, the system compares the topology of the example with that previously taught to ensure one-to-one correspondence. If a difference is present, the system displays the previously taught prototype next to its new instance while blinking the edges that differ. The operator may then re-edit the new instance.

Each prototype has an "effort level" associated with it. One of four levels may be chosen: 1, 2, 3 or 4. An effort level must be assigned when the prototype is first defined, but it may be changed at any later time. This determines how much recognition effort should be used with the prototype. As the effort level increases, recognition speed decreases and more memory is needed, but the recognition success rate increases. The effort level should be chosen as a function of the object complexity (and uniformity) and whether or not the objects will be separate, touching, or overlapping. Effort level is inversely proportional to object complexity. The simpler the part, the more effort needed. Assuming parts touch but do not overlap, the following effort levels should be used:

| LEVEL | TYPES OF PARTS |
| --- | --- |
| 1 | Complicated parts, with more than 30 edges |
| 2 | Parts with 20–30 edges |
| 3 | Simple parts, with fewer than 20 edges |
| 4 | Very simple parts with a few vague features |

In general, a higher effort level must be used when there are fewer features for the vision system to "key on." A feature is a corner or a hole. The vision system recognizes objects by looking for pairs of nearby features that unambiguously indicate the presence of the object in the image. An effort level higher than that specified above will be needed when there are few unique, distinct feature pairs. Example situations are:
Heavily overlapping objects (occluding features)
Mostly ambiguous features (local/global symmetries)
Low contrast (high feature variation between images)

The edges of a prototype are assigned weights and the prototype is assigned a verify percent. The operator provides the values when the prototype is first defined and may change them at any later time. The edge weights and verify percent are primarily used during verification, the final step in the recognition process.

The verification step verifies a match proposal. Given a single prototype-to-image match proposal, this step verifies the presence of the prototype in the image. The prototype boundary representation is transformed to the image and a search is made for image edges that align with the prototype edges. If enough of the prototype boundary is present in the image, the match is accepted. The measure of "enough" is a weighted threshold, based on the edge weights and the verify percent.

If all edges are assigned the same weight, then the verify percent is simply the percentage of the prototype boundary which must align with edges in the image in order for the match to be accepted. For instance, if the prototype verify percent is 70, then 70% of the prototype boundary must be verified by image edges.

If some edges are assigned different weights than others, they contribute different amounts per unit length. For instance, consider a prototype whose outer boundary has a length of Lo and an assigned weight of 50. Assume it has one hole with a length of Lh and an assigned weight of 100. The total weighted boundary of the prototype is (50*Lo+100*Lh). If the verify percentage is 90%, the total weighted length of the boundary which must verify for acceptance is 0.9*(50*Lo+100*Lh). Note that during the verification process, the parts of the outer boundary that verify are measured in length and multiplied by 50 before being accumulated in the verify total. And, the parts of the inner hole boundary that verify are counted with twice the weight.

The operator must be familiar with verify percent, but edge weights are only important for special recognition tasks. Example uses of selective edge weights and verify percents are:

If objects are unlikely to touch or overlap, all edges should have the same weight and the verify percent should be high.

If objects are likely to touch but not overlap, then outer edges should have less weight than the interior edges (for example, 1:2 ration). If overlap is likely, then the difference should be reduced (for example, 3:4 ratio).

If two different prototypes are similar except for one hole, then the hole should be given high weight with respect to the rest of the boundary.

If an object has a hole that is unimportant and not always present, then the boundary of the hole should have a weight of zero. (Actually, the hole should have been deleted from the prototype model at the start.)

If the application is inspection and only a part of the boundary is being inspected, then that part should be given a high weight.

After the user has trained the vision system (by showing it examples of the objects it is supposed to recognize), the system automatically performs "recognition planning." When the system plans, it analyzes the prototypes and fills in recognition strategy tables. To automatically determine the recognition strategy, part symmetry and ambiguous similarities between parts are detected, feature classes are chosen, confirming features are picked that will disambiguate matches, and all lists (e.g., of all feature classes) are ordered to optimize processing speed.

Recognition planning consists of the following processing steps, executed in order:
1. Construct primary feature classes
2. Merge similar primary feature classes
3. Construct subclasses
4. Merge similar feature classes
5. Construct simulated images of the prototypes
6. Classify the boundary features of the simulated prototypes
7. For each feature, find nearby features for confirmation
8. Order all lists to optimize processing speed 1. A feature class is constructed for each corner and hole of each prototype. Each feature class specifies a pair of edge types: line-line, line-arc, arc-line, arc-arc, or circle. The feature classes also specify an acceptable minimum and maximum included angle. Further, associated with each line edge are acceptable minimum/maximum lengths. Associated with each arc edge are acceptable minimum/maximum angular ranges minimum/maximum radii, and a convex-concave indication. Minimum/maximum values are minus/plus two standard deviations from the mean.

2. Similar feature classes are merged. So, for example, if a prototype has been modeled as a square object, its 4 feature classes would be merged into 1 feature class.

Specifically, the merge criteria for merging feature classes GCa and FCb are as follows:

FCa and FCb are "equal" (their types are the same and their mean values fall within the other's range of acceptable values) and every FC that FCb is "equal" to is also "equal" to FCa.

The second condition prevents the epsilon neighborhoods (standard deviation ranges about mean values) from sliding. Otherwise, if A "equals" B, and B "equals" C, but A not "equals" C, then A would be in the same group as C.

3. Subclasses of the primary feature classes are constructed next. In a way, the subclasses should be called super-classes because they often encompass their associated primary feature classes. Subclasses are based on templates permanently programmed into the system. Each of the primary corner types line-line, line-arc, arc-line, arc-arc and circle has about a dozen subclass templates. Based on the templates, up to about a dozen subclasses are constructed for each primary class. The actual number constructed depends on the effort level associated with the prototype. (There are 4 effort levels. At effort level 1, no subclasses are used. At level 2, some are used, and at level 3, more are used. At level 4, all subclasses are used.)

The subclasses templates are ordered so that at higher levels, the feature class encompasses a broader range of features. For instance, a circle feature has subclasses consisting of arc-arc, arc-line, and line-arc pairs at effort level 2. At effort level 4, there are line-line, line-any, and arc-any type subclasses with wide acceptable ranges of lengths, radii, etc.

4. Similar feature classes are merged, exactly as in Step 2.

5. In preparation for steps 6 and 7, images of the prototypes are simulated. An image boundary representation consisting of arcs and lines is constructed.

6. Next, the features of the simulated prototype images constructed in the previous step are classified with respect to the feature classes constructed in steps 1–4. The software that is executed is the same as that which is executed during normal run-time. This is the "classify features" step of image processing.

7. In this step, confirmation features are chosen for each prototype corner. Up to 4 corners are chosen for confirmation. Confirming corners are picked if the prototype is complex (for efficiency, because match verification is expensive), if the prototype corner is ambiguous (indicated by the association of any other corners with the prototype corner's feature classes), or if the prototype corner is a circle and the prototype is not circularly symmetric (circle features provide translation, but not the rotation part of a transformation when a match proposal is made).

If confirmation is needed, nearby corners are chosen and tested for ambiguity. To determine if a nearby corner is unambiguous as a confirming corner, match proposals are proposed between the prototype corner being confirmed and all simulated image corners that have been associated (classified) with the prototype corner's feature classes. If the prospective confirmation corner is successfully used to confirm any proposed match except for the correct one, then the prospective confirmation corner is discarded for reasons of ambiguity. Note that this simulation of proposing and confirming matches is performed by executing the same software that is executed during normal run-time.

8. Finally, all lists are ordered to optimize processing speed. By the time this step has been reached, all feature classes have been chosen, all confirming corners have been picked, and the simulated images of the prototypes are no longer needed. The lists ordered are the lists of all feature classes, the lists of feature classes associated with each prototype feature, and the lists of prototype features associated with each feature class. The list of all feature classes is ordered according to recognition cost, least first.

Once planning has been completed, then part recognition can begin following the flow chart of FIG. 10.

In order to recognize an object, a match must be proposed, confirmed and verified. Some proposed matches require no confirmation, however. Verification per object costs the same, regardless of the feature class that provided the seed or that provide confirmation, however. Verification per object costs the same, regardless of the feature class that provided the seed or that provided confirmation. However, if the match is bad or the resulting transformation is inaccurate, an extra verification may be needed. Extra verifications are counted in the cost estimates. Extra verifications are needed because of inaccuracy and result in refinement of the transformation.

The goal is to order the feature classes so that those near the top of the list are the most promising candidates for the match proposer: only 1 or very few prototype features are associated with the class, no (or little) confirmation is needed, the associated features are high in user-assigned verification weight, image- prototype feature matches from this class provide a relatively accurate proto-to-image transformation, and few "bogus image features" become associated with the class. This last item, number of bogus image features, is the most difficult to directly predict. These are image features that satisfy the feature class' membership requirements but do not correspond to any real feature in the prototype. Quantities of bogus features should only be found on feature classes with very loose membership requirements, and such classes will usually have many prototype features in association and provide relatively inaccurate transformations, so bogus features are handled indirectly.

The basic unit of cost is CNF. Cost in terms of CNF are as follows:

1 match proposal = 1 CNF
1 confirmation = 1 CNF
1 verification = VC*#_corners_in_object*CNF VC is a constant multiplier (currently 3), chosen empirically by comparing some old timings of CPU time spent proposing and confirming matches versus verifying matches. In the following discussion, the word "corners" is used to mean both corners and edges (i.e., features).

The cost per feature class (FC) is:

$$COST(FC) = (F(FC) + A(FC))*I(FC) + D(FC) + W(FC)$$

where:

F(CC) is the cost of proposing matches and confirming them

A)(CC) is amount of ambiguity times cost of verification

D(CC) is the position deviation times cost of verification

W(CC) is the user-assigned weight times cost of verification

I(CC) increases F( ) & A( ) because of effort level imbalance

More specifically $$F(CC) = (SUM[Ccost(c) + CNFcost(Cenf)] * (1 + 1/\#\_c\_in\_CC))/2$$
$$c \text{ in } FC$$

where $$CNFcost(Cenf) = SUM[Ccost(p) * SUM[q \text{ in } FC]/\#\_CC\_in\_p]$$
$$p \text{ in } Cenf \quad FC \text{ of } p$$

"SUM ["represents the summation symbol (capital epsilon). The "c in FC" under the first SUM means for each prototype corner in the feature class. The "p in Ccnf" means for each prototype corner in C's confirmation list and "CC of p" means for each feature class of corner p. In summary, F(CC) is the cost of proposing matches and successfully confirming on e of them, given a single image corner. It is assumed that matches ill be proposed with ½ the prototype corners before a successful match is made and that all confirmations up to that point fail. CNFcost is the cost of testing all the confirming corners on the confirmation list multiplied by the expected number of image corners on the confirming corners' feature classes (assumed to be the same as the number of prototype corners).

Ccost (c) is (1 CNF for L-L, L-other, and circle corner types) or (2 CNF for L-A and A-other types) or (4 CNF for A-A types) *EFFORT_LEVEL(cc)

The additional cost of matching or confirming corners involving an arc covers the additional cost of recentering the arc. So, for a match of a line-other pair with a confirming corner that is a line-line, the proposal and confirmation cost is $1+1=2$ CNFs. A match of a circle with a confirming corner that is an arc-arc will cost $1+4=5$ CNFs. (Circles are not recentered). The cost of verification is independent of line/arc type.

$$W(CC) = (SUM[1/\max(.0001,WT(c))* VC*\#\_c\_in\_object*CNF]/\#\_c\_in\_CC$$
$$c \text{ in } FC$$

W(CC) takes into account any unequal weight between prototype edges. The range of values of WT(c) is 0 to 1. The "max(0.0001,x)" prevents a zero divide. "#_c_in_object" is the number of corners in the object. This times VC*CNF is the cost of verification. The idea here is that if an edge or corner is critical, then it must disambiguate between parts in some important way. Given that the user does not assign special weights to edges, then W(CC) will simply be the cost of one verification.

$$A(CC) = SUM[AMBIGUOUS(c) * VC*\_c\_in\_object*CNF * (\#\_c\_in\_CC - 1)/2$$
$$c \text{ in } FC$$

A(CC) accounts for extra verifications due to ambiguity (possibly symmetry). If the corner has no unique confirming corners, then AMBIGUOUS(c) is 1. Otherwise, AMBIGUOUS(c) is 0. A(CC) will usually be 0. As an example where it is not, however, consider a simple object—a circular object. If another prototype to be recognized has circular holes similar to the circular object to be recognized, then there will be ambiguity. The circular object has no confirming corners, yet will be confused (verifications attempted) with the circular holes of the other object. Note that in this case, the color of the circular object must be the same as the color of the holes of the other object. There are other cases, however, of symmetry or ambiguity, where additional cost must be modeled.

I(CC) is a factor that increase F( ) and A( ) because of effort level imbalance between prototypes. If all prototypes have the same effort level, then I(CC) will be 1.0 for all CC's. Otherwise, I(CC) is greater than 1.0 for CC's whose effort level is greater than the [maximum] effort level of other prototypes. This compensates for the situations in which, for example, a complicated part with 70 corners at level 1 is present with a simple part with 5 corners at level 4. The 4th level CC's of the simple part would otherwise have a lower cost than the level 1 CC's of the complicated part and possibly dominate recognition attention. The complicated part will usually have numerous extra corners forming numerous extra little edges that will be on the simple part's level 4 CC's. The presence of the edges is not compensated for anywhere else in the CCORDER computations. Specifically, the computation is as follows:

$$I(CC) = (\#\_c\_in\_CC + SUM(\#\_c\_in\_P * ifact(P)))/\#\_c\_in\_cc$$
$$\text{proto } P$$

where d = EFFORT_LEVEL(CC) − EFFORT_LEVEL(P)

and ifact(P) = 0    if d = 0
= 2**d/32    otherwise

Finally, D(CC), the most complicated factor, is defined as follows: It is the expected cost of an extra verification due to inaccuracy of the proto-to-image transformation.

$$D(CC) = (SUM[MAX(6,DEV(c)/MAXDIST * VC*\#\_c\_in\_object*CNF]/$$
$$\#\_c\_in\_CC$$
$$c \text{ in } FC$$

MAXDIST is the acceptable distance error margin used by VERIFY, DEV(c) is the "expected" deviation in the transformation that a match of the corner "c" in the specific feature class "CC" will provide. Again, "VC*#_c_in_object*CNF" is the cost of one verification. The rest of this discussion deals with DEV( ).

DEV(c) looks at the corner c, the range of image corners that will belong to c's feature class FC, and estimates how good of a transformation will be provided. There are obvious distinctions that can be made. For instance, a corner made up of two long lines meeting at 90° will provide a more accurate transformation than a pair of short lines with an included angle of 135°. However, the computational model of DEV tries to make even subtle distinctions.

To estimate DEV(c), the translational and rotational components of the proto-to-image transformation are computed separately. First, the expected uncertainty in translation (usually the corner coordinates) is estimated. Then, the uncertainty in rotation angle is estimated. A rotation of the entire prototype by this angle is uncertainty is then hypothesized and the resulting average displacement is estimated and added to the expected uncertainty in translation previously computed. The computations of DEV(c) uses the PCORN's COORD_SD (standard deviation in coordinate position), PLINE's DIR_SD (standard deviation in direction vector angle), and PARC's CENT_SD (standard deviation in center position).

Each feature class specifies an acceptable range of values such as min and max line lengths and radii. Depending on the particular deviation calculation, a specific value is chosen that is midway between the prototype corner's mean value and the feature class' "worst" value. For line lengths, the worst value is the shortest acceptable length. For the angular ranges of corners, it is the acceptable angle closest to 180°. The computation of DEV(c) is performed by case according to the prototype's edge pair types. DEVt(c) is the deviation due to translation and DEVr(c) is the deviation due to rotation.

LINE-LINE. In this case, translation is a function of the corner alone and orientation is a function of the 2 lines' direction vectors, weighted by their lengths. Definitions and the calculation of DEV(c) are:
AP = Proto corner's included angle in the range 0-180°
AC = FC expanded included angle in the range 0-180°
COORD_SD = One standard deviation in the proto corner' position
DEV_SD = One standard deviation in proto's lines' directions (angle)
Lp = Length of the prototype lines (i.e., sqrt(102+112))
Lc = FC reduced length of the lines
D = average distance from corner to other points in object
DEVt(c) = COORD_SD*cos (max(0,Ap−90))/cos (max(0,Ac−90))
DEVr(c) = sin (DIR_SD) *Lp*D/Lc
DEV(c) = DEVt(c)+DEVr(c)
LINE-other. This case is similar to the LINE-LINE case except only one line is used. The corner location is particularly suspect.
Lp = prototype's line length
Lc = FC expanded line length
COORD_SD = One standard deviation in the proto corner's position
DEV_SD = One standard deviation in proto's lines' directions (angle)
D = average distance from corner to other points in object
DEVt(c) = COORD_SD + MAX(0, Lp − Lc)
DRVr(c) = sin (DIR_SD)*Lp*D/Lc
DEV(c) = DEVt(c) = DEVr(c)

The remaining cases involve arcs. All arcs used in the proposal of a match are re-centered. Arcs are re-centered to reduce the uncertainty in perceived position of the arc's center, knowing the arc's radius (same as the prototype arc's radius). The pessimistic positional error of the recentering algorithm is:

RECerr(a) = sqrt(M*M +(M/2*tan(a/2)))**2)

Where a is the FC reduced angular range of the arc and M is the standard deviation in the arc's center position. If the angular range is greater than or equal to 180°, M/tan(a/2) is 0, so the error is simply M.

CIRCLE. For circles, translation depends on the center of the circle and rotation depends on the relative direction of confirming corners (unless the object is circularly symmetric). Note: subclasses of circles (e.g., line-any) are also treated as follows, even though they are on a non-circle class.
Ac = FC reduced angular range of the circle edges
D = average distance from center to other points in object
L(cf) = distance between circle center and confirming corner cf
DEVt(c) = RECerr(Ac)
DEVr(c) = (SUM[DEVt(cf)/L(cf)]/#_cf_in_confirms)*D cf in confirms
DEV(c) = DEVt(c)+DEVr(c)

ARC-other. The arc is re-centered, but half the translation information is in the corner position. As with LINE-OTHER, the corner position is suspect. However, in this case, the orientation of the corner depends on the arc center and corner position . . . a flaky feature at best.
A = angular range of the prototype arc
Ac = FC reduced angular range of the circle edges
R = radius of the arc's circle
D = average distance from center to other points in object
COORD_SD = One standard deviation in the proto corner's position
DEVt(c) = (RECerr(Ac)+(Ap−Ac)*R+COORD_SD)/2
DEVr(c) = DEVt(c)*D/(R/2)
DEV(c) = DEVt(c)+DEVr(c)

ARC-ARC. Both arcs are recentered and the new centers are used to determine the translation (using the mid-point of the two centers) and rotation (using the line connecting the two centers as a direction vector).
Acl, Ac2 = FC reduced angular range of arcs 1 and 2
L = distance between arc centers
D = average distance from center to other points in object
DEVt(c) = (RECerr(acl)+RECerr(Ac2)0/2
DEVr(c) = DEVt(c)*D/L
DEV(c) = DEVt(c)+DEVr(c) LINE-ARC. The line's direction determines the orientation, the arc is recentered, then the new center of the arc is moved toward or away from the corner so that their separation is exactly one radius.
Aip = Proto corner's included angle
Aic = FC extended included angle in the range 0°−180°

Ac=FC reduced angular range of the arc
Lp=Length of proto line
Lc=FC reduced length of the line
DEV_SD=one standard deviation in proto's line's directions (angle)
COORD_SD=one standard deviation in the proto corner's position
D=average distance from center to other points in object
$DEVt(c) = (RECerr(Ac) = COORD\_SD*\cos(\max(0, Aip-90))/\cos(\max(0, Aic-90)))/2$
$DEVr(c) = \sin(DIR\_SD)*Lp*D/Lc$
$DEV(c) = DEVt(c) + DEVr(c)$ Once planning has been completed, then part recognition can begin following the flow chart of FIG. 120. Attached is an Appendix A, incorporated herein by reference, which explains in detail many details of the software used to implement the present invention described above. Attention should be given to Section 4.2 which explains in further detail many of the steps of the flow charts of FIGS. 10-14. If any conflict appears between the text of Appendix A and the flow chart, the flow chart governs.

2.3 SYSTEM SWITCHES

The following switches are settable by the user in the vision system's toplevel command mode. Many of them are present at this stage of development for debug purposes only.

SHOW_RUNS
SHOW_CHAINS
SHOW_BOUNDS
SHOW_EDGES
SHOW_LINES
SHOW_ARCS
SHOW_VERIFICATION
BACKLIGHT
BOUNDARIES
FIT_EDGES
FIT_LINES
FIT_ARCS
FAST_ARCS

RECOGNITION

CRT operates like that in VAL I. If enabled, a typed <BACKSPACE> or <delete> character moves the terminal cursor back a space for overwriting. If disabled, the deleted text is enclosed in backslashes ('\').

SHOW_RUNS, SHOW_CHAINS, SHOW_BOUNDS, SHOW_EDGES, SHOW_LINES, SHOW_ARCS, and SHOW_VERIFICATION specify what is to displayed on the B&W monitor during runtime execution. SHOW_RUNS and SHOW_BOUNDS apply to the normal scrolling mode. If SHOW_RUNS is enabled, the run-length transitions will be shown. If SHOW_BOUNDS is enabled, the boundary of the object is shown. The other SHOW_xxx switches indicate what is to be shown overlaying the region's filled in area during the special display mode SHOW_CHAINS will display the chain encodings which should be the same boundary seen during scrolling display mode with SHOW_BOUNDS enabled. (The sources of information are different, so this is useful for debugging.) SHOW_EDGES shows the straight line segments, with corners, that approximate the chain encodings. This is the result of step 3 of image processing. SHOW_LINES and SHOW_ARCS enable the displaying of lines and arcs, the result of step 4 of image processing. Finally, SHOW_VERIFICATION shows the result of all match verifications, including those that do not pass the verification test. For each proposed match, the prototype is drawn overlaying the image. Edges that are verified are drawn with solid lines. Edges not verified are drawn with dotted lines. At power up, as a default, only SHOW_BOUNDS and SHOW_VERIFICATION are enabled. Warning: if you enable too many display options, the resulting picture will be cluttered. FIGS. 2, 3, 4, 5, respectively illustrate the effect of the SHOW_BOUNDS (or SHOW_CHAINS), SHOW_EDGES, SHOW_LINES & SHOW_ARCS, and SHOW_VERIFICATION switches.

The BACKLIGHT switch defines the "color" of the background. If the background is bright, as in backlighting, then BACKLIGHT should be enabled. Otherwise, if objects are brighter than the background, then this switch should be disabled.

The switches BOUNDARIES, FIT_EDGES, FIT_LINES, and FIT_ARCS are primarily for debugging. It lets the user turn on and off various image processing stages. If BOUNDARIES is disable, image processing from chain encoding forward is skipped (steps 2-7). If FIT_EDGES is disabled, the boundary will be chain encoded, but step 3-7 in image processing will be skipped. If FIT_LINES, FIT_ARCS, or both are disabled, then only that processing step is skipped. Recognition, if enabled, will still be attempted. These switches have value outside of debugging. If only rectangular objects are being recognized, then FIT_ARCS should be disabled. Similarly, if only circular objects are being recognized, then FIT_LINES should be disabled.

FAST_ARCS is an old switch that should probably be removed. It decides between two methods for finding the center of an arc during arc fitting. The time saved by disabling this switch is probably less than 1 or 2 percent of total execution time.

The ARC_TO_LINES switch determines if arcs should be broken during line fitting if the arc can be represented by 2 line segments within the user specified tolerance (MAX_PIXEL_VAR, described in section 2.4 System Parameters). In the current implementation, arcs are fit to the edges before lines are. If the line fitting routine finds that it can re-represent an arc by a single line, then it does so because lines are simpler. The tradeoff of 1 arc versus 2 lines is fairly even, however, particularly since the arc has already been found. Line-line corners may become rounded by a small arc, however. When ARC_TO_LINES is enabled, these rounded corners are resharpened via two short line segments. This switch should normally be enabled.

The RECOGNITION switch is usually enabled. If disabled, processing steps 5, 6, and 7 are skipped.

Last of all, DEBUG_MSGS enables the printing of debugging messages on the terminal. In many cases, source files must first be recompiled with the compilation switch DEBUG enabled. Even then, the control of debug message printing via the DEBUG_MSGS switch is not implemented in all of the code.

2.4 SYSTEM PARAMETERS

The following parameters are settable by the user in the vision system's top-level command mode. Each parameter has an acceptable range of values that is checked when the user attempts to change it.

FIRST_COL
LAST_COL
X_SCALE
MAX_PIXEL_VAR
MAX_DIST
MAX_AREA
MIN_AREA
PROTO_SCALE

FIRST_COL and LAST_COL specify the image window width to use in camera pixel units. The maximum range is 1 to 244 and, of course, FIRST_COL must be less than or equal to LAST_COL. The camera actually has 256 photosensors (0 to 255), but the current implementation uses 8-bit bytes to represent column numbers and columns 0 and 255 are needed to address the background.

X_SCALE is the Y/X ratio, where the Y axis is along the length of the belt and the X axis is along the camera's linear sensor array. This floating point value is multiplied times all X coordinates to make the image square. The user may explicity change it, but it is automatically set during calibration. The allowable range of X_SCALE is [0.6, 1.7]. If it is outside of this range, a different belt-strobe-to-belt-encoder (BSBE) ratio should be used. For instance, if the calibrated X_SCALE is found to be 0.5, then BSBE should be halved so that belt strobes occur twice as often. If X_SCALE is 1.8, then BSBE should be doubled so that strobes occur half as often, providing a better X_SCALE of 0.9.

MAX_PIXEL_VAR is the maximum pixel deviation to be allowed when fitting arcs and lines to the boundary of regions. This tolerance is a distance value, independent of orientation, measured with respect to the straight line edges fit in step 3 of image processing. The edges found in step 3 are always less than a pixel from the original boundary of the binary image. The allowable range for MAX_PIXEL_VAR is [0.0, 8.0]. Values of 1.4 to 2 provide good results given a fairly clean image of objects with smooth edges.

MAX_DIST is the maximum pixel deviation for verifying matches, step 7 in image processing. Like MAX_PIXEL_VAR, this is a distance measure, independent or orientation. But in this case, the distance is measured from the prototype's boundary in its proposed position in the image to nearby image edges. The allowable range of MAX_DIST is [1.0, 16.0]. The choice of value will depend on the variability of the objects being recognized and the proven accuracy of the vision system.

MIN_AREA is the minimum area of regions to be processed. This value is in pixel units and excludes the holes of regions. After connectivity analysis, step 1 in image processing, the area of the outer-most region is known. So steps 2-7 are skipped for regions that are too small. It is an easy way to efficiently eliminate isolated noise from the image. The allowable range of MIN_AREA is [1.0, 65535.0]. A reasonable choice of value is ½ the area of the smallest prototype.

PROTO_SCALE is the prototype scale factor. If, after training, the camera is lowered or raised above the conveyor belt or a lens with a different focal length is used, PROTO_SCALE can be modified to account for the change in image scale. How the user will determine what the correct scale should be is not known at this time. The acceptable range of values for PROTO_SCALE is [0.1, 10.0].

CHAPTER 4

Software Documentation

4.1 DATA STRUCTURES

The major data structures in the vision system are C language STRUCTs. A STRUCT is essentially the same as a Pascal record: a collection of variables, possibly of different types. The collection as a whole has a name and each variable in the collection has a name. Throughout this document, the collection is called a structure and its variables are called members. When a variable declaration is preceded by a '*', it means that the variable is a pointer to a value of the declared type. '**' means that the variable is a pointer to a pointer of the declared type, etc. For a more complete definition of structures and C syntax, see the book *The C Programming Language* B. Kernighan and D. Richie, Prentice-Hall, 1978.

4.1.1 RUN-LENGTHS AND BLOBS

Run-length transitions are represented by the following simple data structure:

```
struct run_info {                /* Run lengths allocation       */
BYTE start, end;                 /* Starting and ending pixel    */
                                    column
struct active_blob *blob;        /* Pointer to blob for these    */
                                    pixels
};
```

The name of the structure is RUN_INFO. It has three members, START, END, and BLOB. START and END are pixel column numbers in the range 0 ... 255. Naturally, START is always less than or equal to END. BLOB is a pointer to a blob structure (ACTIVE_BLOB), defined below. For pixel columns START to END, the blob associated with those pixels is pointed to by BLOB. The following arrays actually pre-allocate RUN_INFO's and an associated array NUM-RUNS.

```
struct run_info
runs[MAXRUN],                    /* List of all current run lengths    */
*run1st[RUNLINS];                /* Points to 1st run of each row      */
int numruns[RUNLINS];            /* (# of runs per row — 1) * 4 bytes  */
```

RUNLINS and MAXRUN are compilation macros, currently defined to be 1024 and 5120 respectively, in the include file VISION.H. RUNLINS is the maximum number of image lines (rows) of data to be buffered. The array RUNS allocates all run-length structures. The array RUN1ST contains pointers to the first run (element of RUNS) for each row modulo RUNLINS. NUMRUNS contains the number of run-lengths per row (minus 1, times 4). Run-lengths in RUNS are filled in sequence, with wrap-around like a circular buffer. So in the current belt strobe count is BELT_Y, then RUN1ST[BELT_Y MOD(RUNLINS)] will be made to point to the first run on the current line. Similarly, NUMRUNS[BELT_Y MOD(RUNLINS)] will be the number of run-lengths used for line BELT_Y (minus 1, times 4).

This run-length data is allocated in Kernal space. Connectivity analysis runs in Kernal mode, filling in the run-length data and using it to separate the regions (blobs) from the background. There are two other uses of the data, however, that are somewhat non-standard. The data is used in User mode, with the appropriate pages mapped, for chain encoding the perimeter. This algorithm is described in section 4.2.2 Chain Encoding. The data is also used for displaying the image data in special 'D' display mode (see section 2.1 Operation by the User) and in training (see section 4.5.4 Training).

Blobs, as determined by connectivity analysis, are represented by the structure ACTIVE_BLOB:

```
struct active_blob {
struct active_blob
*rlink, *flink,         /* Rear and forward blob links  */
*parent, *child,        /* Hierarchy links              */
*sibling;
char color;             /* Color: 0 or 1                */
unsigned ybase;         /* Y min, basis of all Y values */
unsigned area;          /* Blob area in pixels          */
int x_perim, y_perim;   /* Pixel perimeter along X and Y */
int ymax;               /* Y max w.r.t. YBASE           */
};
```

The ACTIVE_BLOBs are usually doubling linked via the RLINK and FLINK pointers. The PARENT, CHILD, and SIBLING pointers are used to establish the standard hierarchy. Holes are children of parents. Mutual holes are siblings. To find all the children of a blob, the blob's CHILD member is referenced. If NULL, then the blob has no children. If not NULL, then it is a hole of the blob. Other holes can be referenced via the hole's SIBLING pointer. The last hole in the list will have a SIBLING pointer value of NULL. The order of siblings is not important. COLOR is 0 or 1, indicating the color of the blob. If the color of a blob is 0, then its children will have color 1, and their children will have color 0, etc.

YBASE is the belt strobe count, modulo 2**16, for the first line of the blob. YMAX is the belt strobe count for the last line of the blob, relative to YBASE. The first run-length for the blob will be on the line of run-lengths pointed to by RUN1ST[YBASE MOD(RUNLINS)]. The blob's last run-length will be on the line of run-lengths pointed to by RUN1ST[(YBASE+YMAX) MOD (RUNLINS)].

AREA is the area of the blob, not counting holes, in units of pixels. X_PERIM and Y_PERIM are the perimeter of the blob along the X and Y axes, respectively, in units of pixel edges. If a blob's area is 1 pixel, then its X_PERIM and Y_PERIM are 2 and 2. Area is only used for the MIN_AREA test (see section 2.4 System Parameters). X_PERIM and Y_PERIM are only used to ensure that enough chain encoding space is available. (X_PERIM+X_PERIM) equals the chain length in bytes.

ACTIVE_BLOBs are allocated in the root overlay segment, common to all overlays in both USER and KERNAL modes. This data structure is the means of transfering blob information from connectivity analysis in Kernal mode to the boundary analysis and recognition routines in User mode. ACTIVE_BLOBS are allocated in the root segment via:

```
struct active_blob
blobs[MAXACTIVE],   /* All the blobs                   */
*fblob;             /* Next available (recycled) blob  */
```

Currently, MAXACTIVE is 128 as defined in the include file VISION.H. When the vision system initializes itself for execution, all BLOBS except BLOBS[0], the first blob structure in the array, are placed on the "free blob" list FBLOB. BLOBS[0] always represents the background blob. FBLOB always points to the next free blob. Other free blobs are linked via their RLINK pointers. So, the following code grabs a new blob:

```
new_blob=fblob;
fblob=fblot→rlink;
```

If FBLOB is NULL, then no free blobs are available—an error condition. The following code frees up a blob after it has been merged with another during connectivity or after it has been copied into a REGION structure for recognition (see the following section 4.1.2 Regions and Bounds):

```
old_blob→rlink=fblob;
fblob=old_blob;
```

4.1.2 REGIONS AND BOUNDS

The most extensively used data structures in the ConveyorVision System are the regions and bounds, defined below. Regions are represented by REGION structures and bounds by BOUND structures. The REGION is an extended copy of the ACTIVE_BLOB structure. When an outer-most blob closes off during connectivity analysis, the analysis/recognition process creates a corresponding copy of the blob and its children as region structures. After the boundary of the region has been chain encoded, the BLOB structure and related run-lengths are freed up and all subsequent analysis is done on the REGION and BOUND representations.

```
struct region {
struct region *parent,  /* Hierarchy links              */
*child, *sibling;
char color;             /* Color: 0 or 1                */
unsigned ybase;         /* Y min, basis of all y values */
unsigned area;          /* Region area in pixels        */
int x_perim, y_perim;   /* Perimeter along x and y      */
BYTE rxmin, rxmax;      /* Bounding box, Y w.r.t. YBASE */
BYTE rymin, rymax;      /* X not scaled, used during training */
int *corn_0, *corn_n;   /* Ptr to first and last+1 corners */
struct bound *bndry;    /* Ptr. to boundary description */
};
```

A REGION's hierarchy links (PARENT, CHILD, and SIBLING) directly reflect the ACTIVE_BLOB's hierarchy links. One exception is that the PARENT of the outer-most region is NULL. The COLOR, AREA, X_PERIM, and Y_PERIM values are simply copied from the ACTIVE_BLOB structure. YBASE, however, is the value of the outer-most ACTIVE_BLOB's YBASE. So holes have the same Y basis as their parent.

RXMIN and RXMAX define the range of the region along the X axis, without the usual calibrated scaling X_SCALE (see section 2.4 System Parameters). These numbers are only computed and stored in the structure during training.

RYMIN and RYMAX define the range of the region along the Y axis, along the travel of the conveyor belt. These numbers are respect to YBASE, so the RYMIN of the outer-most region will always be 0. RMIN and RYMAX are always computed and stored in the REGION structure. They are easily derived from the ACTIVE_BLOB's YBASE and YMAX values.

CORN_O and CORN_N point to X,Y coordinates in the big CORNERS array. The CORNERS array is allocated via

```
int corners[MAX_CORNERS][2];
```

These are the corners fit during the 3rd step in image processing "edge fitting". The Y components are scaled by 16 and the X components are scaled by both 16 and X_SCALE, the calibrated Y/X scale factor. CORN_O points to the first (X,Y) corner and CORN_N points past the last (X,Y) corner. Corners are allocated sequentially in the array without wrap-around.

The last member of a REGION is BNDRY. This is a pointer to a circular list of BOUNDs. The boundary of each region is represented by a circular list of doubly linked BOUNDs. A REGION's BNDRY points to any one of the BOUNDs in the list.

```
struct bound {
struct bound *prev,      /* Links for circular list      */
*next;
struct region *reg;      /* Region being bound           */
BYTE xmin, xmax;         /* Scaled-X and Y pixel range   */
BYTE ymin, ymax;         /* of bounding box (not *16)    */
struct edgend p, n;      /* Link of verified bnd enas    */
unsigned ver_tried;      /* Time last verification tried */
int *b_corner;           /* Pointer into corners array   */
union {
struct line {
BOOL is_arc;             /* Z => line, NZ => arc (below) */
unsigned dir;            /* Tangent angle (0100000==PI)  */
int dx, dy;              /* Unit direction vector *2**14 */
int length;              /* Line length * 16             */
} line;
struct arc {
BOOL convex;             /* +1 => concave, -1 => convex  */
int radius;              /* Arc radius scaled by 16      */
long radius_sq;          /* Radius**2                    */
int center[2];           /* Center of arc's circle (*16) */
unsigned minang,         /* Angular range (0100000==PI)  */
maxang;
} arc;
} its;
};
```

PREV and NEXT are previous and next links for the circular list of BOUNDs. By following NEXT links, the region is traversed in a clockwise direction (assuming the screen's origin is at the top left corner). If the bound is a full circle, then PREV and NEXT point back to the BOUND. REG is a pointer to the BOUND's associated REGION structure.

XMIN, XMAX, YMIN, and YMAX define the bounding box for the bound. YMIN and YMAX are with respect to the region's YBASE. XMIN and XMAX are scaled via X_SCALE, the calibrated scale factor. If X_SCALE increases XMAX (or even XMIN) past 255, then 255 is used because these bounding box coordinates are 8-bit values. The bounding box is used primarily during the verification stage (see section 4.2.7 Match Verification).

The pointers to EDGEND substructures, P and N, are for linking bounds during the verification of matches. P corresponds to the previous (starting) corner and N corresponds to the next (ending) corner. As bounds in the image verify matches, they are linked up so that they are not used to propose other, possibly identical, matches. The EDGEND structure is simply defined as:

```
struct edgend {          /* Links for ends of BOUNDs     */
struct edgend *endmat;
};
```

VER_TRIED is assigned a "time" during verification in order to avoid duplicate attempts when verifying the bounds of prototypes (see section 4.2.7 Match Verification).

B_CORNER is a pointer to a coordinate in the CORNERS array described above. This corner is the ending point of the bound. The beginning point of the bound is (BOUND→PREV)→B_CORNER. If the bound is a full circle, then B_CORNER points to one of any of the CORNERS on the perimeter of the circle.

The last half of the BOUND structure is an ITS union. A line definition is overlayed on top of an arc definition. The bound is one or the other, only. If the bound is a line then IS_ARC is zero. The standard test in the C language for this, given the BOUND pointer BND, is

```
if    - (!bnd->its.line.is_arc)
         /*  Do line calculations   */;
else     /*  Do arc calculations    */;
```

DIR is the tangent angle of the line in VAL's representation, where 360 degrees is equal to 216. DX and DY are unit direction vectors for the line, scaled by 214. So (DX2+DY2) is always equal to 2**28. Length is the length of the line scaled by the usual 16.

If the bound is an arc, then CONVEX is plus or minus 1, depending on whether the arc is concave or convex. Not that if CONVEX is 0, then the bound is a line because CONVEX overlays the line's IS_ARC member. RADIUS is the radius of the arc scaled by the usual 16. RADIUS_SQ is RADIUS*RADIUS, a double integer quality. This value is redundant, but often used. CENTER[0] and CENTER[1] are the X and Y coordinates of the center of the arc's circle. These coordinates are scaled by the usual 16. Last of all, MINANG and MAXANG specify the angular range of the arc. If the arc is a full circle, then these values are both 0. Otherwise, they specify angles where, like a line's DIR, 360 degrees is equal to 2**16. MINANG and MAXANG correspond to corners (BND→PREV)→B_CORNER and BND→B_CORNER for convex arcs. The correspondence is reversed for concave arcs.

4.1.3 PROTOTYPES

The following describes the data structures that define the prototypes.

Many of the structure elements are redundant quantities, precomputed during training in order to speed up processing during run-time. The redundant quantities are noted. All coordinates and lengths are scaled by 16, as are BOUNDs' coordinates and lengths. This will not be mentioned again in this section.

For example prototype data, see PDATA.C and PROTO.C. These model the cover plate previously shown. For models of various chocolates, see the pairs of files (ROUND.DAT and ROUND.C, SQUARE.DAT and SQUARE.C, and TEAR.DAT and TEAR.C).

The data structure that characterizes prototypes is similar to that of REGIONs. Each PROTOTYPE structure represents an enclosed region. Only the outermost (main parent) of a PROTOTYPE is a true prototype in the user's mind. It is the object to be recognized. The PROTOTYPE structure is:

```
struct prototype {
```

```
struct prototype
 *child, *sibling;              /* Hierarchy links                    */
 char color,                    /* Color: 0 or 1                      */
 *name;                         /* Name of the prototype              */
 int max__grace;                /* Main unverified perim. scaled
                                   2**-2                              */
 struct p__corner *bndry;       /* Pointer to boundary description    */
``` corner and an image corner is made, the PARENT pointer in P_CORNERs and then the OBJECT pointer in PROTOTYPEs allow easy reference to the main prototype being recognized.

Each corner on the boundary of a prototype and each circular hole in or around the prototype is represented by a P_CORNER:

```
struct p__corner {
  int cx, cy;                   /* Vertex coordinates                 */
  struct prototype *parent;     /* Pointer to parent                  */
  struct corner__class **class; /* Pointer to corner's classes        */
  struct p__corner ****confirms;/* Distj. list of conj. disjunctions  */
                                /* *** REDUNDANT QUANTITIES FOLLOW *** */
  BOOL edge0__is__arc,          /* Type of EDGE0 and EDGE1            */
       edge1__is__arc;          /* YES => Arc, NO => Line             */
  union {
    struct p__arc *a__ptr;      /* Pointers to previous and next edges */
    struct p__line *1__ptr;     /* either arcs or lines               */
  } edge0, edge1;               /* EDGE0 => Previous, EDGE1 => Next   */
  unsigned bisector;            /* Bisector angle (0100000==PI)       */
};
```

```
struct prototype *object;       /* Pointer to main parent             */
};
```

Like regions and blobs, CHILD and SIBLING are the hierarchy links. However, no PARENT link is needed (except for OBJECT). COLOR is 0 or 1, indicating black or white. NAME is a pointer to an ASCII string, NULL terminated. Only the main parent (outermost region) needs a name and it should be provided by the user.

MAX_GRACE is a valid value only for the main parent. MAX_GRACE is the accumulated amount of weighted perimeter that may be unverified before aborting verification—indicating that the match was unsuccessful. MAX_GRACE is scaled by $2^{**}-2$. When verification of a match begins, this value is assigned to a global variable GRACE. As each bound of the prototype is verified, missing bounds in the image reduce GRACE. When GRACE reaches 0, verification aborts. Specifically, if the length of an bound that was not verified is L and the bound's WEIGHT (see below) is W, then (L*W)/216 is subtracted from GRACE. WEIGHT is scaled by 214, so (L*W)/216 results in a 2-2 scaling. The scalings all work out right.

BNDRY points to a P_CORNER in the same way that BNDRY in a REGION points to a BOUND. The P_CORNERs are links between line and arc bounds and are linked in a circular list.

Last of all, OBJECT points to the main parent—the outer-most PROTOTYPE. This pointer is used then proposing matches. When a match between a prototype P_CORNER's are circularly linked via EDGE0— and EDGE1—the previous and next edges that form the corner when traversing the boundary in a clockwise direction. Each prototype corner points to two edges.

CX and CY are the coordinates of the corner in the prototype's frame of reference. PARENT points to the PROTOTYPE that the corner bounds.

CLASS is a pointer to a list of corner classes. The corner classes are defined in the next section. This list is used for confirming matches. See section 4.2.6 Match Proposal.

CONFIRMS is a distinctive list of conjunctive disjunctions! Like CLASS, this is used to confirm matches. See section 4.2.6 Match Proposal.

EDGE0_IS_ARC and EDGE1_IS_ARC are simply booleans indicating the types of EDGE0 and EDGE1. EDGE0 and EDGE1 are pointers to either P_ARCs or P_LINEs, defined below.

BISECTOR is the angle which bisects the corner in the reference frame of the prototype. The usual angle notation is used: 360 degrees=2**16.

P_ARC represents the arc edges of prototypes, including circular holes:

```
struct p__arc {
  struct p__corner
    *corn0, *corn1;             /* Pointers to bounding corners       */
  int weight,                   /* Importance: 0->1 scaled by 2**14   */
      radius,                   /* Arc radius                         */
      center[2];                /* Center of arc's circle             */
  BOOL convex;                  /* NO => concave circle               */
                                /* *** REDUNDANT QUANTITIES FOLLOW *** */
  long radius__sq,              /* Radius squared (**2)               */
       radius__2__sq,           /* (Radius/2)**2                      */
       too__far,                /* (Radius+MAX__DIST)**2              */
       too__close;              /* (Radius-MAX__DIST)**2              */
  int circum,                   /* Arc's circumference                */
      c__circum;                /* Arc's circle's circumference       */
  unsigned minang, maxang;      /* Angular range of arc               */
};
```

CORN0 and CORN1 point to the two corners that delimit the arc. CORN0 precedes CORN1 when traversing the boundary in a clockwise direction. If the arc is a 360 circle, then CORN0 is equal to CORN1 (the pointers literally point to the same structure).

WEIGHT is a weight of importance for the edge. It is used during verification. When a match has been proposed and the prototype's presence is being verified, part or all of the edge may be unaccounted for in the image. For the length L of the edge missing, L*WEIGHT/(2**16) is the doubt introduced. MAX_GRACE is the maximum accumulated doubt to be tolerated during the verification of a match. It is defined above. In general, edges on the exterior of an object should be given less weight than interior edges because the exterior edges are always more likely to be missing due to touching or overlapping parts. If the presence of certain holes is unimportant, however, then their weight could be minimum. The automatic training routines should propose weights for prototype edges, but the user needs a way to modify them for special applications.

RADIUS and CENTER[2] are the radius and center of the arc's circle in the reference frame of the prototype. CONVEX is simply a convex/concave indicator.

The other members of a P_ARC are redundant, precomputed for run-time efficiency. The comments along side of their declarations should be clear. MAX_DIST, which is a factor in TOO_FAR and TOO_CLOSE, is a user parameter. See section 2.4 System Parameters.

P_LINE represents the line edges of prototypes:

```
struct p_line {
struct p_corner
*corn0, *corn1;         /* Pointers to bounding corners              */
int weight;             /* Importance: 0->1 scaled by 2**14          */
                        /* *** REDUNDANT QUANTITIES FOLLOW ***       */
unsigned dir;           /* Orientation (0100000==PI)                 */
int length,             /* Line length                               */
rlength;                /* 2**16 / line length                       */
unsigned atan_1_lth;    /* ATAN(1/length) (0100000==PI)              */
};
```

CORN0, CORN1, and WEIGHT are the same in P_LINEs as they are in P_ARCs. Note that these member offsets with respect to the beginning of the structures are the same too. Since the end-points, CORN0 and CORN1, uniquely define the line, all other members of a P_LINE are redundant quantities.

DIR is the orientation of the line edge, from CORN0 to CORN1, in the usual angle representation where 360 degrees is 216. LENGTH is the line's length. RLENGTH is 1/LENGTH scaled by 216. Finally, ATAN_1_LTH the angle subtended by a one pixel rise over the length of the line. Specifically, it is ATAN2(16, LENGTH). The comment along side the line of code says 1/LENGTH, but LENGTH is scaled by 16.

4.1.4 CORNER CLASSES

Like the prototype structures, the corner class structures, should be precomputed during training. Part of the data which must be computed at run-time, however, is the list of image corners which belong to a corner class (I_CORN_LST) and the pointer ICORNS in CORNER_CLASS's that point to I_CORN_LST's. The reader should probably just scan this section and then return to it as necessary while reading section 4.2.5 Corner Classification.

Examples of corner class data can be found with the prototype data in PDATA.C and PROTO.C. The prototype files for chocolates mentioned in the previous section are further example.

```
struct corner_class {
struct p_corner **pcorns;    /* Pointer to list of proto corners     */
struct i_corn_1st *icorns;   /* Pointer to list of image corners     */
struct corner_class *equiv;  /* Pointer to equivalent super class    */
char color;                  /* 0 or 1, the region color             */
char circular;               /* NZ => treat as 360 arcs              */
unsigned min_inc_ang,        /* Acceptable range of include angles   */
         max_inc_ang;        /* in 360 degree representation         */
char a_is_arc,               /* For two edges forming the corner,    */
     b_is_arc;               /* 0 => line and 1=> arc                */
char a_no_care,              /* For two edges forming the corner,    */
     b_no_care;              /* 0 => bndry and 1 => other region     */
union {                      /* Edge A allocation                    */
struct cline cline;          /* Either a line or an arc              */
struct carc carc;
} a;
union {                      /* Edge B allocation                    */
struct cline cline;          /* Eitner a line or an arc              */
struct carc carc;
} b;
};
```

PCORNS is a pointer to a list of prototype corners which belong to this corner class. The list must be non-empty and be terminated by a NULL pointer. The PCORNS pointer of other corner classes may point to the same list.

ICORNS is a pointer to a list of image corners that are classified as belonging to this corner class. This list is the product of the corner classification algorithm. If no image corners are found that belong to this class, then ICORNS has the value NULL. Otherwise, the image corners are linked via an I_CORN_LST:

```
struct i_corn_1st {
struct bound *bnd;           /* Pointer to image BOUND              */
struct i_corn_1st *next;     /* Link for list                       */
};
```

The linked list is terminated via a NEXT value of NULL.

EQUIV is a pointer to another corner class, indicating a "super class". The pointing class is a "subclass" of the super class. This is simply used to eliminate redundant recognition attempts. For instance, if the object is a square, then the four right angle corners are all in one corner class, say the "right-angle" class. The acceptable range of angles for the class may be 90 plus/minus 5 degrees. A second corner class may be introduced for the same right angle corners, but with a wider range of allowable angles. This class, say the "wide-right-angle" class, may have an acceptable angular range of 90 plus/minus 15 degrees. All image corners in the right-angle class will also be members of the wide-right-angle class. Since the same prototype corners are associated with both classes, redundant corner matches would be attempted. However, the wide-right-angle's EQUIV is made to point to the right-angle class so that image corner membership in the super class implies membership in the subclass.

COLOR is the color of the prototype region bound by the corners in this corner class. Implicitly, the region's interior is on the right while traversing the corner in the clockwise direction, assuming the display origin is at the top left of the display.

CIRCULAR indicates whether the corner is to be treated as a 360-degree circle. The obvious example is when the corner class is a circle. In this case, the two edges A and B are the same CARC. Less obviously, the corner class may consist of a line-arc combination that is associated with a circle of the prototype. Such a line-arc class would be a subclass (via EQUIV) of the circle class. These variations are sometimes needed because the image data is imperfect. A circular hole in the object may be represented by combinations of lines and arcs instead of a single circle. The CIRCULAR boolean indicates that when proposing a match based on this type of corner class, the two image bounds that form the corner should be refit with an arc of known radius to determine the image circle's center, thereby providing proto-to-image translation.

MIN_INC_ANG and MAX_INC_ANG indicate the acceptable range of included angles formed by the image corner's two bounds. For instance, if the prototype corners associated with this class are right angles (90 degrees), then the acceptable range of included angles for image corners may be 80 to 100 degrees. The angle representation used is ½ the usual scale 360 degrees is equal to 2**15.

A_IS_ARC and B_IS_ARC are booleans indicating whether edges A and B are lines or arcs. Note that this typing refers to the image corners, not to the prototype corners. In the earlier example of a circular hole in the prototype having a line-arc corner class, the corner class describes line_arcs in the image, not circles.

A_NO_CARE and B_NO_CARE are booleans indicating whether one or the other of the two edges that form the corner class is a "don't care" edge. Usually, neither are "don't care", meaning both edges are important. The "don't care" case was introduced for very simple shapes like circular chocolates where there are few or no natural corners on the visible perimeter of the object. When true corners (not circles) appear, it is due to touching parts. In the case of two touching circular parts, the corner is an arc-arc case where each arc belongs to a different object. "Don't care" edges are not used in determining the prototype's position when proposing a match.

Last of all, A and B are substructures—either CLINEs or CARCs. They define the lines or arcs that join at the corner for this corner class. They are defined as follows.

```
struct cline {
int min_lth, max_lth;        /* Acceptable range of line lengths      */
};
Data Structures
struct carc {
unsigned min_ang_range,      /* Acceptable range of angular ranges    */
         max_ang_range;      /* (0100000 == PI)                        */
int min_radius, max_radius;  /* Acceptable range of radii             */
BOOL convex;                 /* NZ => convex, Z => concave             */
};
```

A CLINE simply specifies an acceptable range of line lengths. MIN_LTH and MAX_LTH are the minimum and maximum lengths.

A CARC specifies an acceptable range of angular ranges MIN_ANG_RANGE and MAX_ANG_RANGE in the standard angle representation where 360 degrees is 2**16. If a full circle is being defined, then both the MIN_ANG_RANGE and MAX_ANG_RANGE are 0. MIN_RADIUS and MAX_RADIUS define the acceptable range of arc radii. Finally, the boolean CONVEX is the arc's convex/concave indicator.

4.1.5 TRAINING MODELS

The final data structures defined in this document are used during training: MREGIONs AND MBOUNDs. In the C language, it is easy to let data structures develop as the algorithms which use the data develops. The training structures, MREGION and MBOUND, were initially defined by simply copying the REGION and BOUND structures defined previously. Members with no apparent use during training were deleted.

These data structures will have to be expanded to permit the collection of statistical part dimensions, specifically means and deviations. Then, when the user completes a training sequence or when he starts image processing execution, the data will have to be transferred into the prototype and corner class data structures. See section 4.5.4 Training.

The definitions of MREGION and MBOUND follow:

```
struct mregion {
struct mregion *parent,       /* Hierarchy links                       */
              *child, *sibling;
char color;                   /* Color: 0 or 1                          */
```

```
                            -continued
char *name;              /* Name if parent-most MREGION    */
BYTE rxmin, rxmax;       /* Bounding box                   */
BYTE rymin, rymax;
struct mbound *bndry,    /* Ptr. to boundary description   */
*origin;                 /* Ptr. to origin corner if parent-most */
};
```

PARENT, CHILD, SIBLING, COLOR, RXMIN, RXMAX, RYMIN, RYMAX, and BNDRY have the same meaning here as in REGIONs. BNDRY, however, points to an MBOUND instead of a BOUND. NAME points to an ASCII string which is the name of the MREGION. Only the outer-most MREGION has a name. ORIGIN is a pointer to the user specified "fixed corner". This information is (will be) used during training to make different training instances of the same object coincide. The user points to the "fixed corner" each time using the touch pad. (ORIGIN is not yet used in the implementation.)

```
struct mbound {
struct mbound *prev, *next;  /* Links for circular list      */
struct mregion *reg;         /* Region being bound           */
BYTE xmin, xmax;             /* Scaled-X and Y pixel range   */
BYTE ymin, ymax;             /* of bounding box (not *16)    */
int coord[2];                /* Coordinate of corner         */
union {
struct mline {
BOOL is_arc;                 /* Z => line, NZ => arc (below) */
unsigned dir;                /* Tangent angle (0100000==PI)  */
int dx, dy;                  /* Unit direction vector *2**14 */
int length;                  /* Line length * 16             */
} line;
struct marc {
BOOL convex;                 /* +1 => concave, -1 => convex  */
int radius;                  /* Arc radius scaled by 16      */
int center[2];               /* Center of arc's circle (*16) */
unsigned minang, maxang;     /* Angular range (0100000==PI)  */
} arc;
} its;
};
```

The member components of MBOUND are the same as BOUND except that the corner coordinate is stored in COORD[0] and COORD[1].

4.2 ALGORITHMS

This section describes the major algorithms implemented in the vision system. In particular, the 7 steps in image processing presented in section 2.2 Run-Time Overview are described. In addition, the "bound buckets" and calibration algorithms are described.

4.2.1 CONNECTIVITY ANALYSIS

The connectivity routine processes the camera data provided by the camera interface hardware and extracts closed regions from the background. This algorithm is the standard SRI vision module algorithm. The initial version implemented here was based on Bob Cunningham's Pascal algorithm published in "Robotics Age", July/Aug 1981.

Like most of the Macro routines, this routine was first written in DECUS C. It was later translated to Macro and optimized. In the Macro source file, the C code is present as pseudo-code and conditionally assembled out. The original C code has the most comments.

For each line of image data, the camera interface provides linear array image data in the LSI-11's I/O space. The data consists of a word containing the number of black-to-white and white-to-black transitions, followed by words containing the column numbers where the transitions took place:

```
000005  177014  077040  177123  077201  177400
```

In this example, there are 5 transitions. In octal, the transitions are in columns 14, 40, 123, 201, and 400. The most significant bit in the transition words indicates the light level (black is 0, white is 1). The bits other than the least significant 9 bits (the column number) and most significant bit (the light level) are irrelevant.

The output of the connectivity analysis algorithm is run-length and blob information in the RUN_INFO and ACTIVE_BLOB data structures. See section 4.1.1 Run-Lengths and Blobs. These data structures account for every pixel in the image. For any pixel, there is an associated blob. The blob information consists primarily of the interrelations parent, child, and sibling. Area and perimeters of the blobs are also computed. Centroids and 2nd moments are not computed, however, which makes this connectivity algorithm significantly faster than others.

The connectivity algorithm groups neighboring pixels that are the same color according to the standard 6-connectedness rule. The 6 directions are the double ways of vertical, horizontal, and diagonal (upper-left to lower-right). By including the other diagonal for an 8-connectedness rule, two or more regions could intersect each other, causing topological problems.

The connectivity algorithm processes the transition data from the camera a line at a time. A two-line buffer is used in a flip-flop fashion so that the previous line of transitions can be combined with the current line of transitions. The double lines of data are scanned with a virtual 2×2 pixel neighborhood, as if the two full lines of 256 bits indicating the B&W light levels were available instead of the more succinct transition information. The B&W transitions in 2×2 neighborhoods are represented by code numbers that represent the edge types and the column numbers. All 2×2 pixel neighborhoods are noteworthy except:

| 0 0 | 0 0 | 1 1 | 1 1 |
| 0 0 | 1 1 | 0 0 | 1 1 |

Where pixels are addressed as above (A), below (B), left (L), and right (R), the code numbers of noteworthy neighborhoods are represented by 4-bit numbers: [AL BL AR BR]. Image data is scanned top-down, left to right. The neighborhood at the end of each line is noteworthy, regardless of pixel values. To indicate an end of line, the 5th bit is set. So the code number format is [EOL AL BL AR BR]. In the data array containing the codes, RUN_LENGTHS, the column number is followed by the code number, each occupying one byte.

This RUN_LENGTHS data is picked off two bytes at a time, one byte being the column number and the other byte being the code number, in a WHILE loop around a CASE statement. The code number indicates the case. The source code containing the connectivity analysis is CONNECT.MAC. Since it is a standard algorithm in the public domain, it will not be covered in detail here.

4.2.2 CHAIN ENCODING

After the outer-most blob closes off, the boundary of the region is extracted and represented by a chain encoding representation. The perimeter of the blob is traversed using the RUN_INFO data structure provided by the connectivity analysis. The chain encoding produced is a string of bytes with values 0, 2, 4, 6, or 8 corresponding to movements right, up, left, down, and EOS (End of String). This string traverses the exterior of the blob. So in a blob consists of just two horizontal pixels, then its chain will be 0, 0, 2, 4, 4, 6, 8.

Note that this traversal is in a counter-clockwise direction.

Like most of the Macro routines, this routine was first written in DECUS C. It was later translated to Macro and optimized. In the Macro source file, the C code is present as pseudo-code and conditionally assembled out. The original C code has the most comments.

The algorithm is driven by a case statement within a do-while loop, do while the (X,Y) isn't equal to the starting (X,Y). The case statement is based on the last direction moved in the 6-direction sense. To assure that the entire blob is surrounded, the algorithm always tries to move in direction (DIR-1) where the last direction was DIR. When a new direction is hypothesized, X and Y are modified in anticipation and the new location is tested to see if it falls within the bounds of the blob.

At each new (X,Y) location the algorithm attempts to move to, it performs a point-in-blob test. The point-in-blob test is performed by checking the run-length encoding data structure. Each run-length structure (RUN_INFO) contains a starting X, and ending X, and a blob pointer. Further, an array of pointers (RUN1ST) points to the run-length structures for a given Y. Since RUN1ST[Y] simply points to the start of the RUNS on line Y, the run-lengths can not be random accessed via (X,Y) indices. Starting with the run pointed to by RUN1ST[Y], subsequent run-lengths in the array RUNS have to be searched for the one that encloses the given X. When the run-length is found, the algorithm checks the RUN_INFO's blob pointer with the given blob Unfortunately, this rule still isn't sufficient. Unlike the chain sequence RURUURURUURURUU, the sequence RURURURUURUURUU does not approximate a line. Both sequences have the same number of R's and U's, so both end up at the same point. But the first sequence starts out as a 45 degree line and then turns into about a 25 degree line. To be a straight line, the N and N+1 runs must be evenly distributed throughout the chain. Since "evenly distributed" may again involve a non-integral (not the nice one U to one UU ratio above), this is not trivial to test when scanning the chain. A general and final constraint on chain acceptance ensures that the sequence is linear.

RULE #4: The chain directions must converge to a straight line!

This general rule actually has a fairly simple implementation. As the algorithm scans the chain, keeping rules 1-3, it accumulates the total number of long and short directions. The ratio of longs to shorts (9 to 6 in the RURUU ... run above) is the slope of the line. This ratio must converge in order for it to be accepted. The ratio is constrained by maintaining a progressively constraining, open interval of (minimum ratio, maximum ratio). Given that a ratio of longs to shorts (L/S) has been accepted, the open interval ((L−1)/S, (L+1)/S) is intersected with the previous interval to yield the new interval to be used with the next longs to shorts ratio.

For instance, if LLLU has been scanned, the initial longs/shorts ratio is 3/1 and so the min-max ratios are initialized with (2/1, 4/1). If LLU is then scanned (LLLULLU altogether), the new total ratio is 5/2. Since 2/1<5/2<4/1, LLU is accepted. The interval defined by 5/2 is (4/2, 6/2). When intersected with (2/1, 4/1), the new min-max ratios become the tighter interval (2/1, 6/2).

In summary, the main scanning loop in the algorithm grabs multiple A's followed by one B, computes the new ratio of longs/shorts, checks that it falls within the old min-max ratio, then tightens the min-max ratio. That's the algorithm in a nut shell. Unfortunately, there are some complications involving starting and ending of edges ...

COMPLICATION #1: If the first direction occurs as a multiple, its count isn't reliable.

For instance, if only the last part of the edge AAAABAAAABAAAAB is present, it may appear as AABAAAABAAAAB. To accept this would violate rule #3, but it is a value line. Lines may begin anywhere within their pattern. This complicates the algorithm. Fortunately, it is only relevant if the A's are multiple. (In the program, the variable A indicates the initial direction and B indicates the second direction.) Similarly, line patterns may end anywhere. So, AAAABAAAABAA is acceptable. Algorithmically, this terminating condition is easy to handle.

COMPLICATION #2: Straight lines best approximate chains that start and end in the same direction.

*This is a heuristic. To convince yourself, draw a variety of chain encoded sequences on square graph paper (obeying the above rules, of course). Using to finally determine point-in-blob.

To make the search within RUNS closer to random access and therefore more efficient, a "current offset" value called INSIDE is used. RUN1ST[Y]+INSIDE points to the current run of interest on the current line Y. If the chain encoding just moved to an (X,Y) location that's inside of the run RUN1ST[Y]+INSIDE and an attempt is made to move up to (X,Y+1), the run RUN1ST[Y+1]+INSIDE is checked first. Usually, that run will be within 1 run of the one being looked for.

4.2.3 EDGE FITTING

The edge fitting algorithm efficiently fits straight line segments to the jagged (quantized) edges represented by the given chain encoding. The line fitting is accurate, suitable for raster graphics applications. The jagged edge mathematics underlying the algorithm are as follows.

The chain encoding consists of a string of directions, each if which is Up, Down, Right, or Left. Each instance of a direction in the string indicates a unit move. If a jagged edge approximates a line (i.e., a straight one), the resulting encoding will consist of moves in up to two different directions only. For instance, a diagonal line from the lower left to the upper right would be represented by the string URURURURUR. This string consists of only U and R directions. A line extending from (0,0) to (9.3) could consist of RRRURRRURRRU. This also consists of unit moves in two directions. Actually, any line will be represented by no more than two different directions. So the first algorithmic rule for accepting chain edges is:

RULE #1: Only accept 2 different directions (out of a possible 4).

The second observation to make regarding "raster images" of lines is that they always occur in semi-regular patterns. Horizontal, vertical, and diagonal lines have obvious patterns. Lines in other orientations will occur in multiple-singleton sets. That is, where one direction is A and the other is B, one or more A's will be followed by only one B, then more A's, etc. In the RRRURRRURRRU case above, R occurs in multiples and U occurs as a singleton.

RULE #2: One of the 2 directions must always occur as a singleton.

The direction that occurs in multiples will occur at a constant multiple. The constant, however, may be non-integral (real valued). So in the chain, it may oscillate between n and n+1 occurrences. In the above examples, the multiple direction R repeats in constant multiples of $-3$. However, the sequence DDLDDLDDDLDD approximates a straight line, where D occurs in 2's and 3's.

RULE #3: If one of the directions occurs in multiples, each multiple must consist of N and N+1 (or N and N−1) occurrences.

Lines and arcs should be fit "simultaneously". The problem is that the BOUNDs are allocated during arc fitting, one per arc and one per edge that is not part of an arc. Since this preceeds line fitting, many more BOUNDs are initially allocated for the nonarc edges than are needed. During line fitting, contiguous edges that approximate a line are merged, thereby freeing up BOUNDs. BOUNDs are big data structures and consequently require a significant amount of memory.

LINE FITTING. Line fitting is significantly simpler than arc fitting, so line fitting is described first. This algorithm fits a line to a sequence of corners (points or vertices) by making the first corner fixed, using the second corner as an initial line estimate, and then merging all subsequent corners which are within MAX_PIXEL_VAR[iance] of the line estimate. See section 2.4 System Parameters for a definition of the user parameter MAX_PIXEL_VAR.

More specifically, the line fitting algorithm uses an increasingly constraining range of angles within which the direction of the growing line must fall within. Initially, the first point is fixed and the acceptable angular range is maximal (full 360 range). When the next point in sequence is considered, its direction with respect to the initial fixed point is computed. If this direction is within the current acceptable range of angles, the corner is accepted as a new line end-point and the angular range is tightened. The angular range is tightened by intersecting it with the range [A−E, A+E], where A is the direction of the newly extended line and E is the error margin ATAN2(MAX_PIXEL_VAR, DIST). DIST is the length of the newly extended line.

One additional test made during line fitting is that progress is made away from the initial point of each line. If MAX_PIXEL_VAR is large and the region is small, the angular range test may accept a boundary that backs up on itself. The "progress" test is simple: the distance of the line must increase as it grows in number of corners consumed. Wrap-backs of less than MAX_PIXEL_VAR are accepted, however.

ARC FITTING. The arc fitting algorithm consists of two big nested loops. With each cycle of each loop, the boundary of the region is traversed by another corner. The outer loop proposes an arc's circle center and radius for a segment of the boundary and the inner loop verifies that the boundary fits the proposed arc.

The outer loop proposes arcs based on a span of 3 contiguous edge segments (4 corners in sequence). Mathematically, 2 edge segments (3 corners) are sufficient to define a circle, assuming they are not collinear. But fitting an arc to 2 edge segments is not a data reduction.

If the inner loop verifies that the arc is close enough to the initial 3 edge segments, then it continues with the rest of the boundary, verifying edge proximity to the proposed arc until an edge is found that deviates or a ruler, connect the end points of each sequence with a line. Constraining scanned chains to start and end in an A direction is fairly simple. The variables X_PRE_B and Y_PRE_B and the few lines of code at the label GOTO_B_CORNER do it all. Nice side effects of this constraint are that corners are kept sharp and small enclosed areas (one or few pixels) are enclosed with lines and the lines don't overlap. As an example of this latter benefit, consider the chain sequence ULDR that encloses a pixel. Without complication #2, two corners would be output, one at the bottom-right and one at the upper-left, representing the moves UL followed by the moves DR. Complication #2, however, keeps the four moves independent and so generates all four corners.

COMPLICATION #3: The start of a circular chain encoding is not necessarily a good corner.

This routine has some additional code that assumes the chain encoding is circularly linked, so the initial X,Y is equal to the final X,Y. If the chain encoding does not start at a real corner, an additional corner or two will be generated at the end of the boundary traversal. The algorithm here solves this problem by continuing past the end of the chain, circling a second time, until a fixed point is encountered. By the "fixed point", I mean a corner chosen during the first boundary traversal and then chosen again during the second traversal. In practice, only a few initial corners will be replaced by new ones, so the boundary is not completely traversed twice. If the boundary is completely traversed twice (with completely new corner assignments) the program will give up and return the second set of corners.

4.2.4 LINE AND ARC FITTING

This processing step fits straight line and circular arc segments to the edges produced in the previous processing step, edge fitting. The array of corners that connect the edges is the input to the line and arc fitting algorithm. These corners are on the boundary of the regions, literally on the original chain encoding. Although the original run-lengths and chain encoding disappear at this step in image processing, the corners found in the previous step will remain throughout the recognition steps. All lines and arcs fit by this step are constrained to start and end at a subset of these corners.

The X components of the coordinates of the edges are scaled first. Scaling before fitting the straight line edges is not needed because scaling preserves linearity. However, scaling is needed before fitting circular arcs.

As lines and arcs are fit, BOUND data structures are allocated and filled in with information (see section 4.1.2 Regions and Bounds). These BOUNDs are circularly linked to represent the closed boundaries and attached to their associated REGIONs. (X2,Y2) and the other vector is the perpendicular bisector of the line formed by connecting (X2,Y2) with (X3,Y3).

The perpendicular bisectors (A and B) are represented by a fixed point and a direction vector: (MIDX_A, MIDY_A) and (DX_A, DY_A) for bisector A land (MIDX_B, MIDY_B) and (DX_B, DY_B) for bisector B. By definition, these are

MIDX_A=(X1+X2)/2

MIDY_A=(Y1+Y2)/2

DX_A=Y2−Y1

DY_A=X1−X2

MIDX_B=(X2+X3)/2

MIDY_B=(Y2+Y3)/2

DX_B=Y3−Y2

DY_B=X2−X3

V is parameterized line representation, points on line A are associated and ordered by a single parameter TA:

X=MIDX_A+TA*DX_A
Y=MIDY_A+TA*DY_A

Similarly, the representation for line B has a parameter TB. When the two lines intersect, we have two simultaneous equations with two unknowns:

MIDX_A
+TA*DX_A=MIDX_B+TB*DX_B     (1)

MIDY_A +TA*DY_A=MIDY_B+TB*DY_B    (2)

So, (1) is

TA=(MIDX_B+TB*DX_B−MIDX_A)/DX_A substituting this for TA in equation (2),

Since MIDX_A and MIDX_B have a common term X2 and MIDY_A and MIDY_B have a common term Y2, the derivation is simplified:

$$\text{or TB} = \frac{DY\_A * (X3 - X1) + DX\_A * (Y1 - Y3)}{DX\_B * DY\_A - DY\_B * DX\_A}$$

Having solved for TB, the center of the arc is

CX=MIDX_B+TB*DX_B

CY=MIDY_B+TB*DY_B until the entire boundary has been circled. The edge proximity test has three parts:

1. The distance between the arc's circle center and the corner of the edge must be within MAX_PIXEL_VAR (see section 2.4 System Parameters) of the circle radius.

2. The distance between the arc's circle center and the mid-point of the edge must be within MAX_PIXEL_VAR of the circle radius.

3. The arc must not back up on itself. It could with a region thinner than 2*MAX_PIXEL_VAR. This test is made by ensuring that the corners-to-circle-center angles monotonically increase or decrease. Small "arc-backs" are ignored (the backup is less than MAX_PIXEL_VAR).

Tests #1 and #2 are sufficient proximity tests because either the mid-point or the ends of the edges will be maximally distant from the arc.

If the inner loop finds that the initial 3 edge segments passes the three arc fit tests, but then encounters an edge that does not, then control drops back out into the outer loop. In this case, the outer loop will rerit an arc to the bigger range of edge segments. With more edges to work with, better arc approximations can be made. For instance, if an arc's circle center and radius were estimated for an initial 3 edge segments by the outer loop and the inner loop found that the 5th edge (2 past the initial 3) deviated from the proposed arc, then the outer loop would try to fit an arc to all 5 edges. After refitting, the inner loop starts back at the beginning, verifying that the 5 edges all fit the arc before extending its verification to new edges on the boundary.

The outer loop proposes arcs' circle centers and radii based a sequence of edges by first finding 3 points along the sequence which are maximally distant from each other. Since the edge segments are supposed to be coincident—not just tangent—to the circle being sought, points are chosen on the edge segments near the picked corners for the triangulation mathematics (described below). Given 3 points, triangulation finds a point equidistant to all three (the circle's center). If edge corners were used, then the mid-points of the edges would be closer to the circle center than the end-points of the edges. As a reasonable and efficient compromise, points ¼ of the way into the edges from the end-point are used in triangulation. This way, the end-points will be a little

MIDY_A + (MIDX_B + TB*DX_B − MIDX_A)*DY_A/DX_A − MIDY_B − TB*DY_B = 0 or TB*(DX_B*DY_A − DY_B*DX_A) = DY_A*(MIDX_A − MIDX_B) + DX_A*(MIDY_B − MIDY_A)

$$\text{or TB} = \frac{DY\_A * (MIDX\_A - MIDX\_B) + DX\_A * (MIDY\_B - MIDY\_A)}{DX\_B * DY\_A - DY\_B * DX\_A}$$

further and the mid-points will be a little closer to the circle center computed.

The triangulation algorithm finds the center of a circle given 3 points on the perimeter of the circle: (X1,Y1), (X2,Y2), (X3,Y3). The algorithm first tests if the three points are colinear. If so, no circle can be fit. Otherwise, it finds the point (CX,CY) that it equidistant from the three given ones and returns a convex/concave indicator. The derivation for finding (CX,CY) is as follows.

The center of the circle is the intersection of two vectors. One vector is the perpendicular bisector of the line formed by connecting (X1, Y1) with its length is tested against the acceptable range specified for the corner class: CLINE.MIN_LTH and CLINE.MAX_LTH. If the bound is an arc, then the arc's circle radius, convexity, and angular range are tested against that specifed for the corner class: CARC.MIN_RADIUS, CARC.MAX_RADIUS, CARC.CONVEX, CARC.MIN_ANG_RANGE, and CARC.MAX_ANG_RANGE.

4.2.6 MATCH PROPOSAL

This step proposes matches of prototypes with the image, providing prototype-to-image transformations. Matches are based on corner classes. Every prototype corner and image corner that belong to the same corner class are a potential match. These potential matches, however, must be confirmed by combinations of other classified corners. There are three parts to the match proposal algorithm: (1) picking pairs of corners (one prototype and one image) from each corner class, (2) computing prototype-to-image transformations, and (3) confirming the pairs. Parts 2 and 3 much more complicated than part 1.

During training, the corner classes are ordered according to uniqueness and "clarity". The global array MATCH_ORDER is the ordered list of pointers to corner classes. All corner classes are represented in the list.

The match proposal algorithm operates via three nested loops. The outer loop considers each corner class according to MATCH_ORDER. The middle loop considers each image corner in the current corner class. The inner loop considers each prototype corner in the current corner class. Within the inner most loop, a 2-D transformation matrix is created for transforming the prototype corner to the image corner and the match is confirmed. If confirmed (explained below), then it is verified. If verified (explained in section 4.2.7 Match Verification), then the match is noted and corners used to propose and verify the match are removed from the corner classes (actually, they are just marked as used and then deleted when encountered in the middle loop of this algorithm). When these three loops terminate, processing of the given outer-most region and all its children is complete.

Given a prototype-image corner pair, a complete prototype-to-image transformation is determined. One exception is when the corner is a circle. In this case, the corner pair provides only the translation component of the transformation, so confirmation of an additional corner pair is needed to compute the rotation component of the transformation.

The prototype-to-image transformation is represented by a 3×2 array which is filled in with a rotation by angle A and a translation of Tx, Ty:

| COS(A) | SIN(A) |
| −SIN(A) | COS(A) |
| Tx | Ty |

4.2.5 CORNER CLASSIFICATION—FIG. 13

The corner classification algorithm sorts all corners and circular holes in the image according to predefined corner classes. Corner classification is fairly simple.

Corners, according to classification, are used to propose matches and to confirm the proposed matches. (Match proposals are described in the next section.) When a match is proposed, a prototype-to-image transformation is proposed. This 2-D transformation is based on the relative position of an image corner and a prototype corner. One consequence of this is that corners formed by bounds along the edge of the belt are not to be trusted, so they are not put in classes. Such corners are most likely artificial, so a 2-D transformation based on them are likely to be random.

With respect to the data structures defined previously, the algorithm is as follows. For each BOUND in the circular list pointed to by the REGION's BNDRY subfield, the corner that it and the previous BOUND define is compared with the various prototype corner classes. For each class that the corner belongs to, an I_CORN_LIST is allocated, it is made to point to the BOUND, and the list element is appended to the CORNER_CLASS's list of other I_CORN_LIST's.

Each image corner is compared with each prototype corner class via two nested loops (FOR each corner . . . FOR each class). The first test within the inner loop is for "superclass" membership. That is, if the current corner class points to the previous corner class via EQUIV and the current corner is a member of the previous class, then the corner is not considered for membership in the current class. If corner class A is a superclass of corner class B, then B is a subclass of A—all members of A would qualify as members of B. This superclass test eliminates duplicate classifications that would only produce redundant match proposals.

The comparisons made between each image corner and prototype corner class are:

1. The two bounds that form the image corner must be of the same type, line or arc, as the two edges that define the corner class. In the case of a circle corner class, both image bounds must define a circle (the same one, of course).

2. The included angle formed by the two bounds of the image corner must be within the acceptable range MIN_INC_ANG and MAX_INC_ANG of the corner class, taking into account the color of the region being bound (whether to measure the convex or concave side of the corner).

If these two tests are passed, then the two bounds that form the image corner are individually tested. For each bound, if the bound is a line then Arc-arc. Both image arcs are RECENTERed (see above). Then, the centers of the two image arc's circles and the centers of the prototype arc's circles are passed to the subroutine TWO_PT_TRANS which computes the transformation. TWO_PT_TRANS connects a virtual line between each pair of coordinates, one pair in the image and one pair in the prototype. Rotation is computed that will make the prototype line parallel to the image line. Then the prototype line is rotated. The mid-points of the image line and rotated prototype line are then compared to compute the translation.

Line-any. This is the simplist case of all. The orientations of the two lines are compared to compute the rotation. Then the coordinates of the image corner and rotated prototype corner are compared to compute the translation.

Arc-any. The image arc is RECENTERed, providing a relatively accurate center for the image arc's circle. Then the subrouting TWO_PT_TRANS is passed the circle centers and corner coordinates and it computes the transformation. See the arc-arc case above.

"Confirmation" serves as a quick evaluation of the match (quick relative to verification) and as a disambiguation method, needed before an official match proposal can be made. With each prototype corner (circular holes included) is an associated list of confirming corners. Confirming corners are usually near the corner that is the seed of the match.

Each prototype corner that may be the seed a match points to its confirming corners indirectly via CONFIRMS. This member of its P_CORNER structure is defined as:

STRUCT P_CORNER ****CONFIRMS;

The general form of the boolean confirmation expression is the list (CONFIRMS) of conjunctions (ANDS) of disjunction (ORS). An example of a list of CONFIRMS are as follows where A, B, C, etc. represent prototype corners:

|   | A |
|---|---|
| or | B & C |
| or | D & (E \| F) |
| or | (G \| H) & (I \| J \| K) & (L \| M) |

Prototype corner A is confirmed (or satisfied or true), by definition, if there is a corresponding image corner in A's expected position and orientation in the image. If any of the above lines in the CONFIRMS list can be satisfied, the match is confirmed. Knowing the proposed prototype-to-image transformation, confirmation would proceed as follows. Consider prototype corner A. Transform it to the image. Look at its list of corner classes. For each image corner in each class, see if it is near the transformed A. If so, is its orientation also close to that of A? If so, the match is confirmed. Otherwise, keep trying the other image corners in A's corner classes.

The SIN and COS entries are scaled by 214. Tx and Ty are pixel addresses scaled by the usual 24. To fill in this matrix, the rotation angle A must be found first by comparing corner orientations. Then, the prototype corner is rotated by A so that Tx and Ty may be computed. If translation is computed simply on the basis of corner locations, then where (Ix, Iy) is the image corner and (Px, Py) is the rotated prototype corner, Tx and Ty are:

$$Tx = Ix - Px \text{ and } Ty = Iy - Py$$

The function NEWTRANS computes the transformation given the prototype and image corner pair. The derivation is performed on a case basis in order to maximize the information in the corner pair. The cases are based on the prototype corner's edge types: line-line, line-arc, arc-arc, line-any, and arc-any. These implicity include the reverse types: arc-line, any-line, and any-arc.

When an image arc is being paired with a prototype line, the end points of the arc are simply connected to imagine the arc as a line. If the an image line is being paired with a prototype arc, then the routine RECENTER is called to fit an arc to the image line's underlying boundary, knowing the prototype's arc's circle radius. The circle center returned by RECENTER is then used for imaging the image line as an arc. Note: this latter case is much more common than the case where an image arc is imagined to be a line.

Line-line. In this case, the rotation angle is the weighted average of the two differences in proto-image line directions. Each line is weighted by their minimum weight. For instance, if the image corner's lines are I1—I2 and the prototype's lines are P1—P2, then I1 and P1 are a pair and I2 and P2 are a pair. They respectively suggest a rotation angle of (DIR(I1)—DIR(P1)) and (DIR(I2—DIR(P2)). Instead of simply using their average (½ their sum), their suggestions are respectively weighted by MIN(LTH(I1), LTH(P1) and MIN(LTH(I2), LTH(P2)). Having computed the rotation angle, the translation is simply the difference in corner locations, as explained earlier.

Line-arc. The line-arc case is the most complicated. The image bound that corresponds to the prototype arc is RECENTERed as an arc, regardless of whether it was originally fit with an arc. It is refit knowing the prototype's circle radius, thereby providing a more precise image arc's circle center. The line components of the image and prototype corners are alone used to determine rotation. Then the prototype arc's circle center is rotated to the image. The two circle centers, one from the image arc and one from the prototype arc, are used to estimate the translation. Then, the translation is "finely tuned" by sliding the prototype corner toward the image corner so that the corners' lines coincide. Note that the actual corner coordinates are not used. They are not used because line-arcs are usually tangent at their joining corner and such corners are usually inaccurate. In summary, the lines in a pair of line-arc corners determine rotation alone. The centers of the arcs determine the translation along the line. Then, any resulting distance between the parallel lines are used to adjust translation so that the lines coincide. of color and NO_CAREness, the corner location stored in the given image bound and the transformed prototype corner must be close in proximity. At worse, the bounds of the prototype must be swapped along with their attributes MINANG/MAXANG, DIR, etc.

If the match that initiated the confirmation process was between two circular types of features, then only the translation component of the match is known initially. If the object is truly circularly symmetric, then there is zero rotation. Otherwise, confirmed features determine the rotation component of the transformation matrix. The global boolean variable NO_ROT_YET indicates that no rotation is known yet. As long as it is not known, the confirmation strategy is to compute the distance between the seed prototype corner and the confirming prototype corner and compare it with the distance between the seed image corner and confirming image corner. If these two distances pass the "near enough" test, then the transformation is completely determined. The confirming corners' orientations must also be compared (if they are not circular), knowing the prototype-to-image transformation, in order to finalize the confirmation.

4.2.7 MATCH VERIFICATION

The match verification algorithm verifies a prototype-to-image match by measuring the prototype's goodness of fit to the image boundaries. Another, equally important function of verification, is to mark the corners that verify a successful match as being used so that they are not used to propose the same match again. "Used" bounds may help to verify another match, but they may not be used to propose a new match.

The match verifier transforms the prototype to the image and determines how much of the prototype's boundary coincides with image boundaries. The value MAX_GRACE in the prototype data structure indicates how much of the prototype boundary may be missing before aborting verification. Every line and arc has its own weight, a scale factor for the missing length (see section 4.1.3 Prototypes).

Prototype and image bounds are compared, regardless of whether their types agree. Similarly with confirmation, image lines may have to be "imagined" as arcs or image arcs may have to be "imagined" as lines. In order for an image bound to verify a prototype bound, however, it must be within the distance MAX_DIST (see section 2.3 System Switches) and roughly have the same orientation. Included with the rough orientation test is the sense of color change across the edge (black to white versus white to black). If only a part of an bound is within MAX_DIST, then only that part is counted as verifying If A doesn't confirm the match, then try prototype corners B are C. Here, both B and C must have correspondence with image corners for confirmation. If one or both don't have correspondence, then the search continues to the next list of conjunctions D & (E | F). Here D and either E or F must have correspondence in the image.

Usually conjunctions are needed only when there is symmetry of features around a matched feature. When objects have many features, then requiring duplicate confirmation (via conjunctions) will assure success during the verification phase where the entire prototype boundary is traversed and compared with the image bounds. On the other hand, very simple objects such as chocolates verify quickly, so confirmation would provide no advantage.

A match is always between an image BOUND and a prototype P_CORNER. The BOUND's corner is the match with the P_CORNER. Each corner is connected to two edges. The edges are different structures (other image BOUND's or prototype P_LINE's or P_ARC's) except when the region is a full circle. In that case, the two edges are the same arc.

Corner classes define a pair of edge types (e.g., line-line, line-arc, etc.) and certain constraints on lengths, radii, angular ranges, etc. Corner classes are defined for the variety of prototype corners. Image corners are placed into corner classes at run time if they are of the right type and fit within the constraints. The image corners (BOUND's) must have the right edge types for the class, but the example prototype corners on the class's PCORNS list do not. That is, the corner class may be line-line, but the prototype corner in association with it may be a line-arc. This allows for flexible image-prototype matching.

The confirmation strategy is to "imagine" that the given image BOUND in the corner class is like the prototype corner. So if a line-line BOUND pair is in a prototype line-arc's line-line corner class, the second line BOUND is reconfigured as an arc of a known radius (the prototype's). The routine RECENTER does this by returning the "imagined" arc's circle center in the image. The old image line and the new imagined arc are then compared with the prototype's line-arc for confirmation.

The corner class attributes A_NO_CARE and B_NO_CARE may specify that one of the two edges that connect to the prototype corner is a "don't care". This means that half of the corner (one of the two edges) is of no concern in confirming the match. The corner point, however, is important as well as the edge which is not x_NO_CARE. For instance, if the corner class is of type line-arc and B_NO_CARE is true, the arc is of no consequence. The line and its join (corner) with the arc are important only.

The boundaries of regions are always traversed in the same direction. So if the prototype region and the image region are different colors (black versus white), then the edges of one must be reversed in direction for coincidence. The corner classifier does this when classifying image corners. So an arc-line corner may be in a line-arc corner class if the image region is the opposite color of the prototype region. This, in combination with A_NO_CARE and B_NO_CARE, complicate the confirmation process. In general, regardless Whenever possible, the verifier traverses the prototype and image boundaries concurrently. This is possible as long as it does not get "off track" because of a mismatch or occlusion. To initially get on track or to get back on track, bound buckets are used. The bound bucket module (algorithm and local data structures) provides a list of image lines and arcs that are in a given rectangle—the rectangle that bounds the prototype bound currently being verified. See section 4.2.8 Bound Buckets.

The main verify procedure is passed the main prototype to be verified. It then calls itself recursively for each child of the prototype, for their children and siblings, etc. For each edge on the boundary of a prototype the main procedure transforms the edge's corner to the image and then calls VER_LINE or VER_ARC, depending on the type of the edge.

When called, VER_LINE transforms the prototype line's direction vector to the image and looks for image bounds to verify it. If this is not the first prototype edge to be verified, then it tries the image bound last used (or the image bounds connected to it). Otherwise, it must call the bound buckets routine to find image bounds in the vicinity of the given prototype line. Regardless of the source of the candidate image bounds, the image bounds are each considered until the entire prototype line is accounted for. Depending on the type of each image bound, functions LINLIN or LINARC are called to evaluate the coincidence of the prototype line and image bound.

Similarly, VER_ARC transforms the prototype's arc's circle center and angular range to the image. A strategy almost identical to VER_LINE is used to locate candidate image bounds for verification. Depending on the type of each candidate image bound, functions ARCLIN or ARCARC are called to evaluate the coincidence of the prototype line and image bound.

LINLIN. Given a prototype line and an image line, LINLIN determines how much of the two coincide within MAX_DIST and returns the parameter range of the prototype line TO→TN and of the image line TiO→

Tin that is in correspondence. First, LINLIN determines if the prototype line and the image bound have the same colors on the left and right (whether the gradients across the bounds point within 180 degrees of the same direction).

LINLIN then splits the problem into two cases. If the two lines are nearly parallel (less than a 1 pixel rise over the line's total length) then LINLIN assumes the lines are parallel. The computation is faster and it avoids a possible division overflow when looking for the lines' intersection point. In the parallel case, LINLIN computes the line to line distance from the mid range of the image line. It then computes the image line's parameters in the parameterization of the prototype line and then intersects the image line's transformed parameters with the prototype's: [0,length]. If the resulting range is empty, there is no correspondence.

In the second case, where the lines are not nearly parallel, the lines' intersection point is computed. The distance range ±d about the intersection point for which the line-to-line distance is less than MAX_DIST is then determined. This range is intersected with the two lines' parameter ranges (0 to line's length) and if the resulting range is non-empty, the result is used.

The computation of the line-line intersection point is as follows. Where (Xp, Yp) [PDx, PDy] is the definition of the prototype line and (Xi, Yi) [IDx, IDy] is the definition of the image line, the two lines' intersection point in the parameterization of the image line TI_MID as defined below. The derivation for this equation was presented in section 4.2.4 Line and Arc Fitting.

$$Ti\_mid = \frac{(Yi - Yp) * PDx - (Xi - Xp) * PDy}{IDx * PDy - IDy * PDx}$$

The corresponding intersection point in the parameterization of the prototype line is T_MID:

T_mid=(Xi−Xp+Ti_mid*IDx)/PDx or

T_mid=(Yi−Yp+Ti_mid*IDy)/PDy depending on which is greater, PDx or PDy.

Next the unconstrained parameter range uTiO→uTin and uTO→uTn around Ti_mid and T_mid, respectively, are computed where the distances between the uTiO→TO and uTin→uTn points are each MAX_DIST and the following distances are all equal: uTiO→Ti_min, Ti_mid→uTin, uTO→T_mid, T→mid→uTn.

range=maxd/(2*SIN(inc_ang/2))

uTiO=Ti_mid−range uTin=Ti_mid+range uTO=T_mid−range uTn=T_mid+range

The parameter range uTiO→uTin must be constrained by the image line's parameter range O→length:

TiO=MAX(uTiO, 0)

Tin=MIN(uTin, length)

Similarly, the proto line's parameter range must be constrained to 0→plength.

TO=MAX(uTO, 0)

Tn=MIN(uTn, plength)

If either TiO→Tin or TO→Tn are empty ranges, the lines are coincident nowhere. Otherwise, the image line's constraint must be applied to the proto's range and vise versa. Again, if the resulting TO→Tn is empty, the lines are coincident nowhere.

LINARC. Given a prototype line and an image arc, LINARC determines how much of the two coincide within MAX_DIST and then returns the parameter ranges of the line and arc that are in correspondence.

The line-arc coincidence test is made by measuring the closest distance between the line and the arc's circle center. If it is within the circle's radius±MAX_DIST, then the two points on the line that are exactly a distance of radius+MAX_DIST away from the circle's center are found. These points delimit the range of coincidence. This range is then intersected with both the arc's range and the line's range, possibly producing two intervals of coincidence.

If the circle is small with respect to MAX_DIST and the line is either on the wrong side of the circle center or on the right side but closer to the center than the perimeter, the line is moved to the right side and placed midway between the center and the perimeter.

To compute the line-arc coincidence, the two points on the line that are radius+MAX_DIST distance from the circle center are found. The line parameters that correspond to these points are intersected with the line's parameter range and the angular parameters that correspond to these restricted points are intersected with the angular range of the arc.

ARCLIN—ARCLIN is very similar to LINARC. Given a prototype arc and an image line, ARCLIN determines how much of the two coincide within MAX_DIST and then returns the angular ranges of the arc and line that correspond. The arc-line coincidence test is made by (1) measuring the closest distance between the arc's circle center and the line. If this is within the circle's radius±MAX_DIST, then (2) the two points on the line that are at a distance of exactly radius+MAX_DIST, are found. These two points are the line's range within coincidence.

ARCARC. Given a prototype arc and an image arc, ARCARC determines how much of the two coincide within MAX_DIST then returns the angular ranges of the two arcs that are in correspondence. The arc-arc coincidence test is made by making sure the two circles' perimeters are within MAX_DIST at a cotangent point. The "co-tangent" point is on the axis formed by their circles' centers. The larger of the two circles is then contracted by MAX_DIST/2 and the smaller is expanded by MAX_DIST/2 and the two points where these circles intersect is computed. The range of coincidence is the angular range between the two intersection points that includes the nearest co-tangent point.

ARCARC first determines if the two arcs are parameterized in different directions (one's convex and the other's concave) and then determines if their B&W color is the same. Next, ARCARC determines if the two circles are too far apart or too deeply nested in order for their perimeters to lie within MAX_DIST.

The circle-circle intersection computation is as follows. Let Rp and Ri be the radii of the proto and image circles, respectively. Let Cp and Ci be the coordinates of the circles' centers and CC be CCDIST, the center-to-center distance. The problem is to find one of the two intersection points,

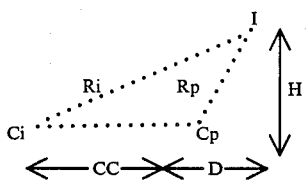

The triangle formed by the two circle centers Ci and Cp and the desired intersection point I form the basis for the solution. By dropping a perpendicular from I to the Ci→Cp line, two right triangles are formed providing the following simultaneous equations:

$$Rp^{}2 = H^{}2 + D^{**}2$$
$$Ri^{}2 = H^{}2 + (CC + D)^{**}2$$

So, $H^{}2 = Rp^{}2 - D^{**}2$
and $Ri^{}2 = (Rp^{}2 - D^{}2) + (CC + D)^{}2$
$= Rp^{}2 - D^{}2 + CC^{}2 + D^{}2 + 2^*CC^*D$
$= Rp^{}2 + CC^{}2 + 2^*CC^*D$ $2^*CC^*D = Ri^{}2 - Rp^{}2 - CC^{**}2$
$D = (Ri^{}2 - Rp^{}2 - CC^{**}2)/2^*CC$
$= ((Ri^{}2 - Rp^{}2)/CC - CC)/2$
$= ((Ri - Rp)^*(Ri + Rp))/CC - CC)/2$ Then, knowing D, $H = SQRT(Rp^{}2 - D^{}2)$.
$= SQRT((Rp - D)^*(Rp + D))$ The angular range of the two intersection points around the prototype circle is ATAN2(H, D) and the angular range around the image circle is ATAN2(H, CC+D). For faster calculation and simplicity, a single angle is computed ATAN2(H,(CC+D+D)/2) as a ±range about both circles.

Finally, ARCARC sorts the 6 angles that correspond to the prototype arc's min and max angles, the image arc's min and max angles, and the min and max angles of coincidence. Then each of the 6 intervals formed by the 6 angles are classified to determine which are in all three ranges: image arc, prototype arc, coincidence "arc". These are the desired angles. There may be up to two disjoint segments in common. 4.2.8 BOUND BUCKETS Buckets compensate for the lack of a "nearness" relation between neighboring bounds or regions. The BOUNDs interrelate bounds that are connected at corners and REGIONs relate whole regions according to the classical parent, child, and sibling relations. These data structures allow the algorithms to process all regions or traverse the perimeters of regions efficiently. It does not, however, help to efficiently determine which bounds or regions are nearby, but not necessary connected to, other bounds.

Buckets provide a procedural form of the nearness relation. For any rectangular neighborhood around a point, the BNDS_IN_BOX entry point in BUCKETS.C will return a list of the lines and arcs which are inside the "box".

Nearness is needed primarily when verifying the match of a prototype to the image. A transformation involving translation and rotation places an instance of the prototype over the image. This match is then verified by looking for the prototype's edges in the image and comparing their positions. Given specific locations in the image where prototype edges are, BNDS_IN_BOX locates nearby image bounds for verifying.

BNDS_IN_BOX could employ any of a variety of search strategies and associated spatial representations of the image:

1. Exhaustive search of the bounds data structure
2. 2-D street map search through "nearby" relations that augment the bounds data structure
3. 2-D search through the image's [compacted and augmented] run-length encoding representation
4. Recursive descent through tree of enclosing rectangles (boxes) or a quadtree representation
5. Note the bounds in a faster memory and do a spiral search around the specified point.
6. "1.5-D hash" function (explained below)

Strategies 2-5 all provide big improvements in search time over the simple, brute force method of strategy 1, but they require a special data structure for each image that would be expensive in CPU time to construct. And some strategies, particularly 5, would use too much memory.

Strategy 6 has been chosen for its relatively low cost to initialize and repeatedly use. It is similar to strategies 2-5: a data structure is initially constructed which spatially represents the image for quick determination of what bounds are near any given point.

The data structures and access algorithm resemble a hashing function using buckets—hence the name "buckets". The data structures' outer most access is via an array of bucket pointers, one for each line of image data. Each bucket contains a list of pointers to the bounds that occur on its associated line. To locate bounds in a rectangle with X and Y ranges of [XO,Xn] and [YO,Yn], the routine BNDS_IN_BOX looks at buckets on lines YO to Yn, checks the bounds in the lists and keeps those with a range of X that intersects the range XO to Xn. (Min and max X are stored in the bound structures.) The resulting list is the list of nearby bounds.

The following figure shows a sample image with 14 bounds, labeled O-E, and corners noted by *'s. Their are 11 lines of image data, numbered on the left. Associated with each line is a bucket illustrated below by the "bounds/line" column. This column lists the bounds present on its line. When there is no change from the line above, the column entry is simply ("'"). In fact, space in the data structure is saved by sharing buckets between contiguous lines of no change.

```
Line Bounds/line   IMAGE (bounds labled 0-E, vertices = *'s)
  11 ─>CD          *CCCCCCCCCCCCCCC*DDDDDDDDDDDDD***
  10 ─>19A7B          1              9              A 7 B
   9 ─>"              1              9              A  7   B
   8 ─>187            1           *8 8 8 8 8 8 8 8 8*   7      *
   7 ─>12674          1              2              6    7    4
   6 ─>1254              1           2           *5 5 5 5 5*    4
   5 ─>1234                1         2                    3    4
   4 ─>"                   1         2                    3  4
   3 ─>"                1            2                    3 4
   2 ─>"                   1         2                    34
   1 ─>E0                              *EEEEE*0 0 0 0 0 0 0 0 0 0 0 0 0 0*
```

The two C structure definitions defined for bound buckets are:

```
struct edge_bucket {
struct edge_list *edges;
BYTE lin0, linn;
BOOL same_above;
}
buck_supply[256],         /* Total allocation */
*fbuck,                   /* Pointer to free BUCK_SUPPLY */
*buckets[256];            /* Ptr's to bucket per line */
struct edge_list {
struct edge_list *next;
struct bound *bnd;        /* High bit => SAME_ABOVE, address >> 1 */
}
edge_supply[MAXBUCKEDGE], /* Total allocation */
*fedge;                   /* Ptr to free EDGE_LIST */
```

Refering to the above figure, EDGE_BUCKETs correspond to the "Line Bounds/line" columns. EDGE_LISTs represent the "IMAGE (bounds . . .)" part of the figure. BUCK_SUPPLY is the total allocation of EDGE_BUCKETS. BUCKETS is an array of pointers to used ones from the supply. FBUCK points to the next available EDGE_BUCKET. Initially, FBUCK points to BUCK_SUPPLY[0]. BUCKETS are used in sequential order and are never freed (except all at once for a new region). Line numbers are used as indices into the BUCKETS array. Contiguous BUCKETS[ ] may point to the same EDGE_BUCKET (e.g., where quotes were used in the "Line Bounds/line" columns in the above figure).

The LINO and LINN members of EDGE_BUCKET define the inclusive line number range for which the EDGE_BUCKET is applicable. The EDGES member points to the list of EDGE_LISTs or is NULL. The EDGE_LIST struct is simply a linked list of pointers to BOUND structures. EDGE_SUPPLY is the total allocation of EDGE_LISTs and FEDGE points to the next free one. Like EDGE_BUCKETs, EDGE_LISTs are allocated strictly sequentially and freed up all at once.

The SAME_ABOVE boolean in an EDGE_BUCKET or the SAME_ABOVE bit in an EDGE_LIST (the high bit in the BND pointer), is set when the remaining list of bounds are a subset of those on the previous line. For instance, if bounds A, B, and C extend from line 30 to 60, then three EDGE_LISTs would be used linking pointers to A, B, and C: A→B→C. If bound D is then encountered with a line range of 20 to 40, two more EDGE_LIST would be allocated with the following pointer structure:

| EDGE BUCKETs   | EDGE LISTs      |
|----------------|-----------------|
| Lines 20-29:   | D               |
| Lines 30-40:   | D→A→B→C         |
| Lines 41-60(s):| /               |

The "(s)" indicates that SAME_ABOVE is true in the EDGE_BUCKET. The two "/" are a pointer to the A→B→C sequence on the previous line. The reason for SAME_ABOVE is efficiency. If BNDS_IN_BOX is called to find all bounds first search through the list of EDGE_LISTs "Lines 30-40" for bounds in the in a certain X range on lines 35 to 75, for instance, BNDS_IN_BOX would given X range. Then it would search the next list "Lines 30-60". As soon as BNDS_IN_BOX encounters a true value of SAME_ABOVE, it would stop searching along the list because it knows that the remaining EDGE_LISTs are duplicates from the previous line.

New EDGE_LISTs are always added to the left of the list. Extending the above example, assume bound E with a Y range of 50-60 is added to the bucket data structures. One EDGE_LIST would be allocated:

| EDGE BUCKETs    | EDGE LISTs      |
|-----------------|-----------------|
| Lines 20-29:    | D               |
| Lines 30-40:    | D→A→B→C         |
| Lines 41-49(s): | /               |
| Lines 50-60:    | Es/             |

The combination of "/" and "|" indicates a pointer to the A→B→C list. The "s" next to "E" indicates that the SAME_ABOVE bit in EDGE_LIST is set.

What is claimed:

1. In a vision system for identifying touching parts, a method for identifying an object independent of the orientation of said object, comprising the steps of
   (a) developing sensory data comprising an image of said object;
   (b) separating closed regions from background by connectivity analysis of the data representing said image;
   (c) developing a chain encoded representation of a region boundary of each of said closed regions of said image;
   (d) fitting edge segments to the chain encoded representation of each region boundary to produce a more succinct representation of the boundary of each of said closed regions of said image;
   (e) fitting straight line and circular arc segments to the edge segments to create edges and corners which characterize said image;
   (f) classifying said straight line and circular arc segments by feature classes, each said feature class describing a group of related features with a specific range of lengths, radii, included angles and/or angular ranges, one or more of said feature classes being associated with each of a plurality of prototypes stored in memory of said vision system to facilitate matching said image with one or more of said plurality of prototypes;
   (g) proposing a match of an image of said object to said prototype based on said feature present in said object being classified in feature classes associated with said prototype; and
   (h) verifying the match of the object and the prototype by translation and rotation of a region boundary of the prototype to align with the image of the object to match features of said image with features of said prototype whereby the object can be identified even when overlying another part.

2. A method as in claim 1 including
   the steps of training the system to recognize sample parts characterized by features,
   the step of identifying said object comprising comparing features of said object to features of said prototype,
   proposing a match when the comparison of one or more features of said prototype matches one or more features of said object, and
   placing the prototype in a particular position and orientation relative to the image to confirm the identity of the object.

3. A method as in claim 2 including the step of traversing the complete boundary of said object looking for evidence of its identity based on identified segments, and
   summing up said evidence of verified segments and comparing said sum to an acceptance threshold to verify the position and orientation of the object.

4. A method as in claim 2 wherein a camera is positioned to develop sensory data on a line-by-line basis representing images of objects moving past on a conveyor belt, the camera being perpendicular to the travel of the conveyor belt so that scaling may be presumed to be constant for the prototype being used for training and the object to be recognized.

5. A method as in claim 2 wherein following said training step and during the planning step, feature classes are defined,
   features of the image with a proper edge type and having dimensions within said specified ranges being associated with said feature class to identify the image.

6. A method as in claim 5 wherein the feature classes comprise classes for identifying corner features of said image, said corner features being defined by adjacent ones of said straight line and circular arc segments as line-line, line-arc, arc-line, and arc-arc, the comparison step comprising comparing boundaries of said corner features defined by said fitted straight line and circular arc segments of said image to said feature classes defining a group of similar corners of said prototype.

7. A method as in claim 6 wherein the comparison between each said corner feature of said image and said corner defining feature class is made on the basis that said boundaries of said image corner must be of the same type as boundaries of the corner defining feature class.

8. A method as in claim 7 wherein the boundaries of each said corner feature of said image define an included angle, each said corner defining feature class defines a range of included angles, the image corner being assigned to one of said corner defining feature classes as being of the same type only if the included angle of the image corner is within the range of the angles of the corner defining feature class.

9. A method as in claim 8 including the further steps during planning of associating with each said corner defining feature class of said prototype an acceptable maximum/minimum included angle, associating with each line component of a feature class an acceptable maximum/minimum length, and associating with each said arc component of a feature class a minimum/maximum angular range, minimum/maximum radius and concave/convex indication.

10. A method as in claim 9 including the further step of testing the boundaries of each said corner feature of said image as compared to limits established during said planning step for said feature classes, including the steps of testing each line boundary for length, and testing each arc boundary for radius, convexity, and angular range.

11. A method as in claim 10 wherein said step of testing boundaries of image feature corners is carried out only for image features assigned to prototype feature corners as matched features of the same type.

12. A method as in claim 7 wherein said training step includes the further step of assigning weights to each edge of said prototype, so that during said step of verifying a match between said image and said prototype the fact that part or all of an edge of said image is missing can be taken into account.

13. A method in claim 7 wherein said training step includes the step of assigning an effort level to each said prototype including the step of assigning weights to the edges of a prototype and assigning a verify percentage to the prototype, said image of said object being verified as identified with the prototype if a sufficient percentage of the boundary of the prototype is identified with edges in the image.

14. A method as in claim 13 wherein said step of verifying the identification of said object image comprises calculating a minimum verify amount $= VP \times \hat{E}(W \times L)$ where VP is the verify percentage of a prototype i.e., the minimum amount to indicate verification;

W is the weight assigned to one edge of said prototype; and

L is the length of said one edge of said prototype.

15. A method as in claim 1 wherein said edge segments are connected at corners, the step of fitting line segments to said image comprising selecting one of said corners as a starting point of a line segment, using a second corner which is a next adjacent corner along the boundary as an initial line estimate, and continuing the line through subsequent corners to establish a continuing direction of the line which falls within a maximum angle variation from an initial direction of said line.

16. A method as in claim 15 wherein the step of fitting a line segment continues for a series of points through which the constraints are satisfied that the continued direction of the line falls within an allowable angular variation in direction from the previous point, and that the length of said continued direction line is increasing, the process including the step of tightening the acceptable angular variation for each said point added to said continued direction line.

17. A method as in claim 15 including the step of fitting arc segments to said image comprising the steps of proposing an arc based on a minimum of four corners of a sequence of three of said edge segments, proposing a center and a radius for said arc, and verifying that said boundary defined by said sequence of edge segments fits the proposed arc.

18. A method as in claim 6 of proposing a match between said image of an object to be recognized and said prototype comprising the steps of selecting one of said corners from said prototype and from said image of said object to be identified, computing a transformation of said selected corner of said prototype to align said corner with said selected corner of said image, and confirming a match between said prototype and said image by the presence of at least one other prototype corner near to and oriented with a corner of said image.

19. A method as in claim 18 wherein said step of verifying the identification of said object image comprises calculating a minimum verify amount $= VP \times \hat{E}(W \times L)$ where VP is the verify percentage of a prototype i.e., the minimum amount to indicate verification;

W is the weight assigned to each of said edge segments of said prototype; and

L is the length of said edge segments of said prototype, said image being identified only if said minimum verify amount exceeds a preset minimum.

20. A method as in claim 2 comprising the step of planning for the recognition of said image of said object by the steps of constructing said feature classes for each pair of said edges of said prototype and for said edges of said prototype, merging similar ones of said feature classes, constructing subclasses of said feature classes, said subclasses defining potential ones of said pairs of said edges adapted to fit said feature class, constructing an image of boundary representation of said prototype consisting of arcs and lines, assigning features of said prototype to said feature class and subclasses, and selecting confirming features to use to confirm a match of a feature of said prototype with a feature of said image.

* * * * *